(12) United States Patent
Ito et al.

(10) Patent No.: US 10,962,797 B2
(45) Date of Patent: Mar. 30, 2021

(54) AERIAL IMAGE DISPLAY DEVICE

(71) Applicant: Funai Electric Co., Ltd., Osaka (JP)

(72) Inventors: Tatsuya Ito, Osaka (JP); Fuminori Tanaka, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 176 days.

(21) Appl. No.: 16/174,609

(22) Filed: Oct. 30, 2018

(65) Prior Publication Data
US 2019/0179160 A1 Jun. 13, 2019

(30) Foreign Application Priority Data

Dec. 13, 2017 (JP) .............................. JP2017-238258

(51) Int. Cl.
*G02B 30/56* (2020.01)
*G02B 26/08* (2006.01)
(Continued)

(52) U.S. Cl.
CPC .............. *G02B 30/56* (2020.01); *G02B 5/122* (2013.01); *G02B 5/124* (2013.01); *G02B 17/006* (2013.01);
(Continued)

(58) Field of Classification Search
CPC . G02B 17/00; G02B 5/00; G02B 5/12; G02B 30/56; G02B 5/122; G02B 5/124;
(Continued)

(56) References Cited

U.S. PATENT DOCUMENTS

| 6,478,432 B1 | 11/2002 | Dyner |
| 8,279,268 B2 * | 10/2012 | Vrachan ................. G02B 30/56 348/51 |

(Continued)

FOREIGN PATENT DOCUMENTS

| JP | 2012-137779 A | 7/2012 |
| JP | 2013-257529 A | 12/2013 |
| WO | 2017/141956 A1 | 8/2017 |

OTHER PUBLICATIONS

The extended European search report for the corresponding European application No. 18200152.9, dated Apr. 1, 2019.

*Primary Examiner* — Kristina M Deherrera
(74) *Attorney, Agent, or Firm* — Global IP Counselors, LLP

(57) ABSTRACT

An aerial image display device includes a display component, an imaging component, and a first limiter. The display component has a display surface for displaying an image. The imaging component has a first reflecting surface and a second reflecting surface that are arranged perpendicular to each other along an image formation plane of the imaging component. The imaging component forms an aerial image of the image in a display area that is symmetrical with the display surface with respect to the image formation plane. The first limiter is disposed closer to the display component than the imaging component. The first limiter limits an incident angle of incident light incident on the imaging component. The first reflection surface and the second reflection surface are inclined by an angle between 30° and 60° with respect to a median plane that includes a perpendicular of each of the display surface and the image formation plane.

20 Claims, 21 Drawing Sheets

(51) Int. Cl.
  *G02B 5/124* (2006.01)
  *G02F 1/133* (2006.01)
  *G02B 27/00* (2006.01)
  *G02B 5/122* (2006.01)
  *G02B 17/00* (2006.01)
(52) U.S. Cl.
  CPC ..... *G02B 26/0816* (2013.01); *G02B 27/0018* (2013.01); *G02F 1/13318* (2013.01)
(58) Field of Classification Search
  CPC .............. G02B 27/0018; G02B 17/006; G02B 26/0816; G02F 1/13318
  USPC ....................................................... 359/223.1
  See application file for complete search history.

(56) References Cited

U.S. PATENT DOCUMENTS

2011/0181949 A1     7/2011   Hashikawa
2012/0242958 A1*   9/2012   Zuloff .................... G02B 30/40
                                                                               353/10

* cited by examiner

AERIAL IMAGE DISPLAY DEVICE

CROSS-REFERENCE TO RELATED APPLICATIONS

This application claims priority to Japanese Patent Application No. 2017-238258 filed on Dec. 13, 2017. The entire disclosure of Japanese Patent Application No. 2017-238258 is hereby incorporated herein by reference.

BACKGROUND

Field of the Invention

The present invention generally relates to an aerial image display device. More specifically, the present invention relates to an aerial image display device for displaying an aerial image.

Background Information

Generally, an aerial image display device displays an aerial image (see Japanese Patent Application Publication No. 2012-137779 (Patent Literature 1), for example). This aerial image display device makes use of a display panel and an imaging optical panel. The image displayed on the display panel is formed by the imaging optical panel as an aerial image in a display area in the air, which is symmetrical to the display panel with respect to the imaging optical panel. Consequently, the user can see an aerial image that appears to float in the air.

SUMMARY

However, with the conventional aerial image display device, so-called ghost images are formed separately from the aerial image (the real image) due to unnecessary light that does not contribute to form the aerial image, out of the light from the imaging optical panel. Therefore, a problem occurs in which the visibility of the aerial image (the real image) is diminished.

One object is to provide an aerial image display device with which the visibility of an aerial image can be improved by suppressing the formation of a ghost image.

In view of the state of the known technology and in accordance with an aspect of the present invention, an aerial image display device includes a display component, an imaging component, and a first limiter. The display component has a display surface for displaying an image. The imaging component has a first reflecting surface and a second reflecting surface that are arranged perpendicular to each other along an image formation plane of the imaging component. The imaging component forms an aerial image of the image in a display area that is symmetrical with the display surface with respect to the image formation plane. The first limiter is disposed closer to the display component than the imaging component. The first limiter limits an incident angle of incident light incident on the imaging component. The first reflection surface and the second reflection surface are inclined by an angle between 30° and 60° with respect to a median plane that includes a perpendicular of each of the display surface and the image formation plane.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. The following embodiments described below represent comprehensive or specific examples. It will be apparent to those skilled in the art from this disclosure that the following descriptions of the embodiments are provided for illustration only and not for the purpose of limiting the invention as defined by the appended claims and their equivalents. Thus, the numerical values, shapes, materials, constituent elements, arrangement positions of constituent elements, connection modes, and so forth shown in the following embodiments are just examples, and are not intended to limit the present invention. Also, of the constituent elements in the following embodiments, those constituent elements not described in an independent claim are described as being optional constituent elements.

First Embodiment 1-1. Overall Configuration of Aerial Image Display Device

Figure 1:
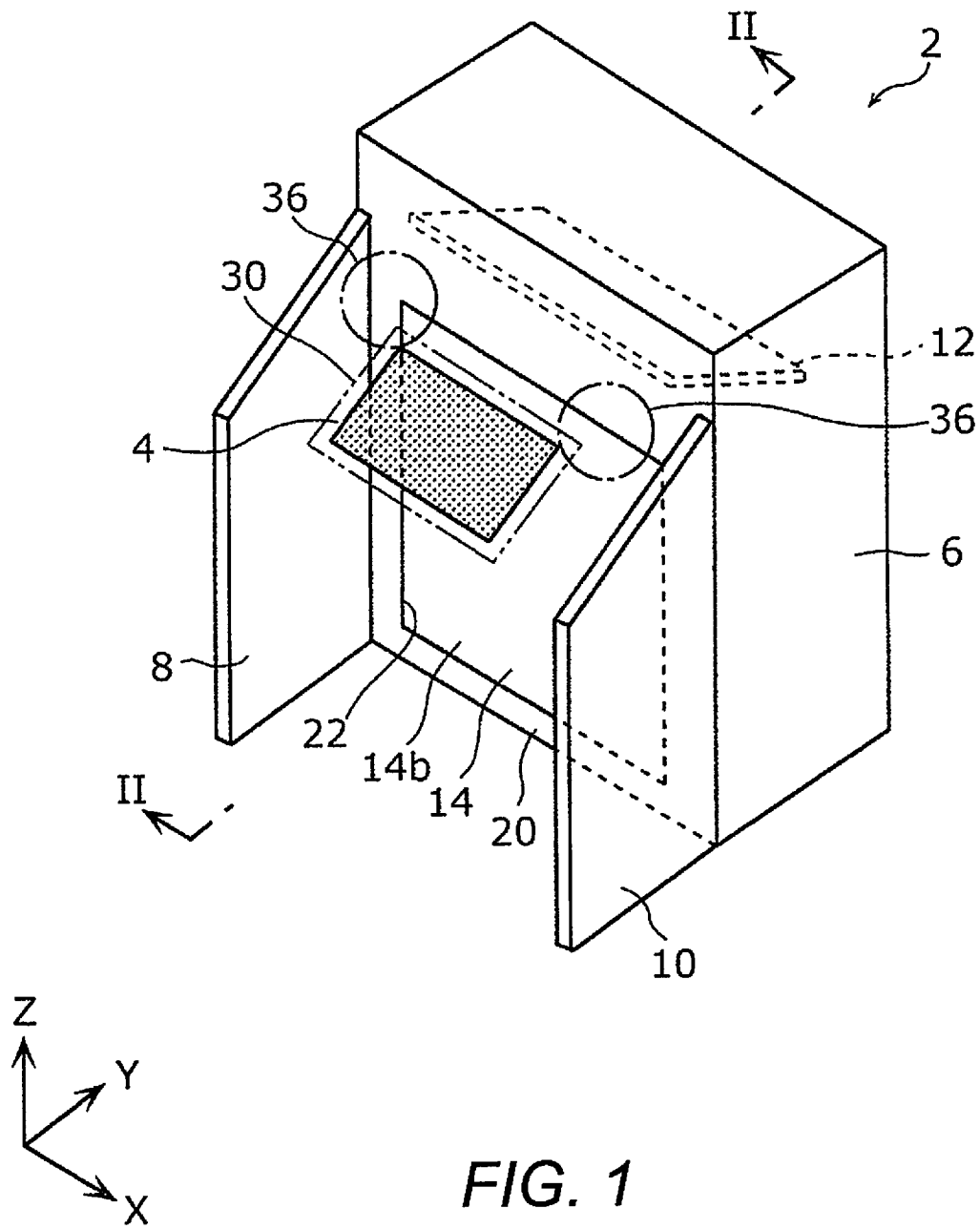
FIG. 1 is a perspective view of the appearance of the aerial image display device pertaining to a first embodiment.
Figure 2:
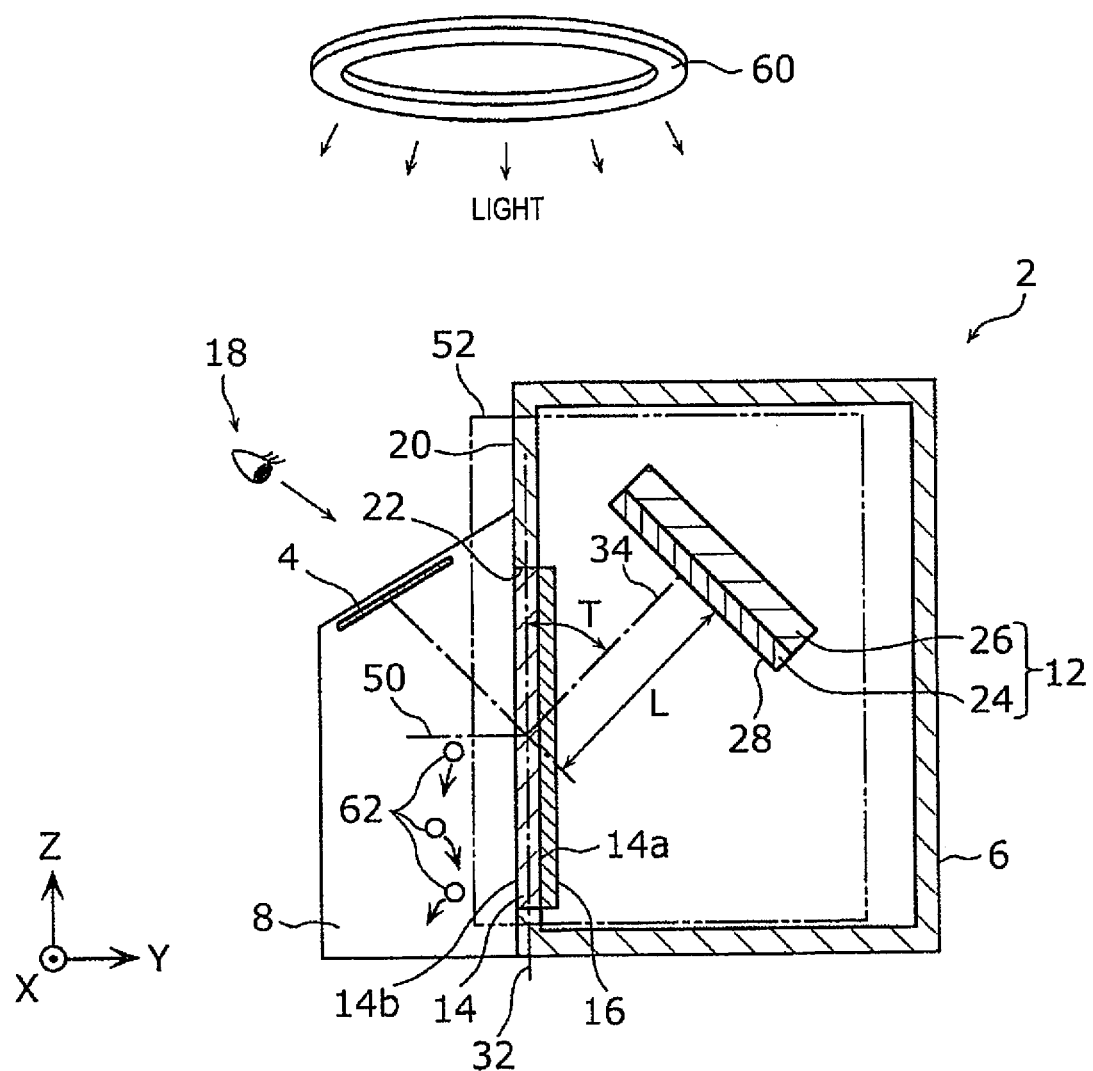
FIG. 2 is a cross sectional view of the aerial image display device pertaining to the first embodiment, taken along the II-II line in FIG. 1.

First, the overall configuration of the aerial image display device 2 pertaining to a first embodiment will be described through reference to FIGS. 1 and 2. FIG. 1 is a perspective view of the appearance of the aerial image display device 2. FIG. 2 is a cross sectional view of the aerial image display device 2, taken along the line in FIG. 1.

As shown in FIGS. 1 and 2, the aerial image display device 2 functions as an aerial display or floating display for displaying an aerial image 4. The aerial image 4 is a floating image in the air, and can be a still image or a video. The aerial image display device 2 basically includes a display unit 12 (an example of a display component or display), and an imaging optical panel 14 (an example of an imaging component or optical element), and a louver film 16 (an example of a first limiter). The aerial image display device 2 also includes a housing 6, and a pair of side wall portions 8 and 10.

The housing 6 is formed in a hollow cuboid shape, for example. A rectangular opening 22 is formed in the side face 20 on the front side (the user 18 side) of the housing 6. The side face 20 of the housing 6 extends in the vertical direction (Z axis direction). The housing 6 at least houses the display unit 12 and the imaging optical panel 14. The housing 6 is made of a material, such as metal or resin, suitable for supporting the display unit 12 and the imaging optical panel 14.

The side wall portions 8 and 10 respectively project forward from the left and right end portions of the side face 20 of the housing 6 so as to partition the imaging optical panel 14, which is disposed in the opening 22 of the housing 6, from both the left and right sides. The side wall portions 8 and 10 make it less likely that outside light from the lateral direction will be reflected into the imaging optical panel 14. As shown in FIG. 2, the upper end portions of the side wall portions 8 and 10 are inclined with respect to the horizontal direction (Y axis direction) and extend parallel to the aerial image 4. Consequently, the user 18 can easily ascertain the position of the aerial image 4 by using the top edges of the upper end portions of the side wall portions 8 and 10 as references. The upper end portions of the side wall portions 8 and 10 may extend horizontally at the same height position as the height position (the position in the Z axis direction) of the aerial image 4. In an environment where no external light is generated from the lateral direction, the pair of side wall portions 8 and 10 may be omitted.

In the illustrated embodiment, the term "parallel" not only means being perfectly parallel, but also encompasses the meaning of being substantially parallel, such as when there is a difference of about a few percent, such as five percent, with respect to perfectly parallel. Likewise, the term "vertical" not only means being perfectly vertical, but also encompasses the meaning of being substantially vertical, such as when there is a difference of about a few percent, such as five percent, with respect to perfectly vertical.

The display unit 12 is a unit for displaying an image serving as the source of the aerial image 4, and is disposed inside the housing 6. As shown in FIG. 2, the display unit 12 has a display panel 24 and a backlight 26. The display panel 24 is, for example, a liquid crystal display panel. However, the display panel 24 can be different types of display panel, as needed and/or desired. A display surface 28 for displaying an image is formed on the front face of the display panel 24. The display surface 28 of the display panel 24 is inclined with respect to the vertical direction (at 45°, for example). The backlight 26 emits light on the rear face (the face on the opposite side from the display surface 28) of the display panel 24. The backlight 26 includes, for example, a light source, such as a light-emitting diode (LED). However, the backlight 26 can be different types of light source, as needed and/or desired. Furthermore, display unit 12 can by different types of display, such as organic light-emitting diode (OLED) display, as needed and/or desired.

The imaging optical panel 14 is an optical device or element that forms the aerial image 4 of the image that is displayed on the display surface 28 of the display panel 24 in the display area 30 in the air. The imaging optical panel 14 is a flat plate formed from a translucent resin material, for example. The imaging optical panel 14 is disposed in the opening 22 of the housing 6. The imaging optical panel 14 has an image formation plane 32. As indicated by the one-dot chain line in FIG. 2, the image formation plane 32 is an imaginary plane passing through the center in the thickness direction (Y axis direction) of the imaging optical panel 14. Also, the image formation plane 32 is a plane that is parallel with the incident face 14a and the exit face 14b of the imaging optical panel 14. The image formation plane 32 is disposed in the vertical direction along the side face 20 of the housing 6. Consequently, as shown in FIG. 2, since the imaging optical panel 14 does not receive external light from a lighting fixture 60 installed on the ceiling or the like of a room, for example, it is less likely that external light will be reflected into the imaging optical panel 14. Also, since dust or other such foreign matter 62 floating in the air falls along the imaging optical panel 14, the foreign matter 62 is less likely to adhere to the imaging optical panel 14.

Also, the image formation plane 32 is disposed to be inclined with respect to the display surface 28 of the display panel 24 (at 45°, for example). The incident face 14a of the imaging optical panel 14 is arranged to face the inside of the housing 6, and the exit face 14b is arranged to face the outside of the housing 6. The specific configuration of the imaging optical panel 14 will be described below.

As shown in FIG. 2, the distance L between the image formation plane 32 and the display surface 28 is preferably 30 to 200 mm, for example. When the distance L is shorter than 30 mm, the aerial image 4 will be too close to the side face 20 of the housing 6, which diminishes the sense that the aerial image 4 is floating. On the other hand, when the distance L is longer than 200 mm, the resolution of the aerial image 4 decreases. In the illustrated embodiment, this distance L is measured along the direction perpendicular to the display surface 28. Also, the angle T between a perpendicular line (or perpendicular) 34 of the display surface 28 and the image formation plane 32 is preferably from 30° to 60°, for example. When the angle T is less than 30°, the view angle of the aerial image 4 will be too narrow. On the other hand, when the angle T is greater than 60°, there is not enough separation between the aerial image 4 and ghost images 36 (discussed below). In the illustrated embodiment, the angle T is set to 45°, for example.

The louver film 16 is an optical film for limiting the incident angle of light incident on the incident face 14a of the imaging optical panel 14. The louver film 16 is disposed closer to the display unit 12 side than the imaging optical panel 14. More specifically, the louver film 16 is disposed at a position covering the incident face 14a of the imaging optical panel 14, that is, the face of the imaging optical panel 14 on the display unit 12 side. The specific configuration of the louver film 16 will be described below.

With the above-mentioned aerial image display device 2, the aerial image 4, which is a true copy of the image displayed on the display surface 28 of the display panel 24, is formed in the display area 30, which is in the air and is in plane symmetry with the display surface 28 of the display panel 24 with respect to the image formation plane 32 of the imaging optical panel 14. The aerial image 4 is rectangular in plan view and is displayed inclined with respect to the vertical direction (at 45°, for example). The image displayed on the display surface 28 and the aerial image 4 are in a 1:1 relationship, with the imaging optical panel 14 as the axis of symmetry. That is, the distance from the image formation plane 32 to the image on the display surface 28 is equal to the distance from the image formation plane 32 to the aerial image 4 in the display area 30.

1-2. Configuration of Imaging Optical Panel

Figure 3:
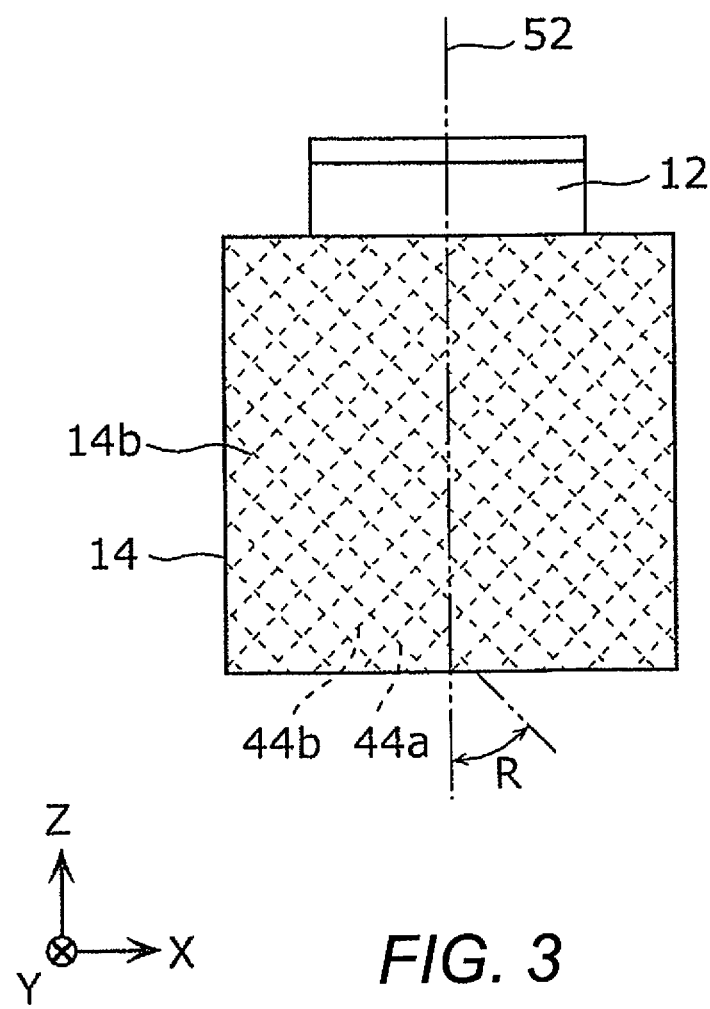
FIG. 3 is a diagram of the exit face side of an imaging optical panel pertaining to the first embodiment.
Figure 4A:
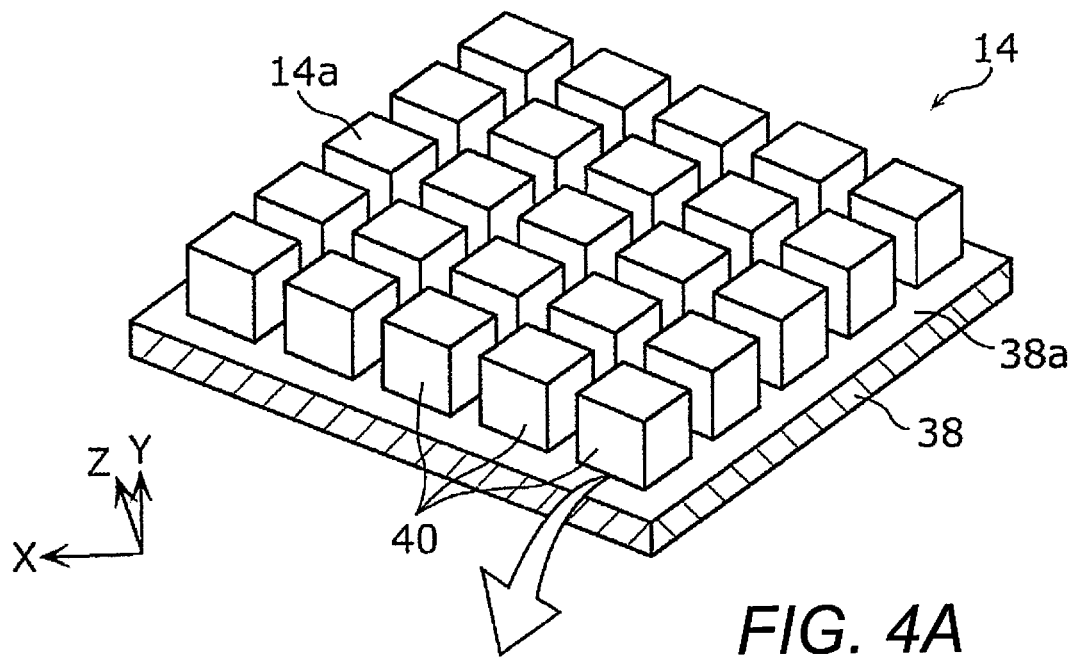
FIG. 4A is a cross-sectional perspective view in which part of the incident face side of the imaging optical panel pertaining to the first embodiment has been cut out.
Figure 4B:
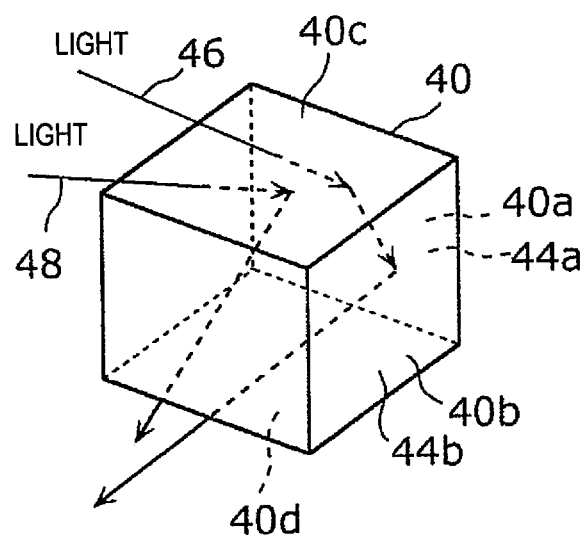
FIG. 4B is a perspective view of a dihedral corner reflector of the imaging optical panel.
Figure 5:
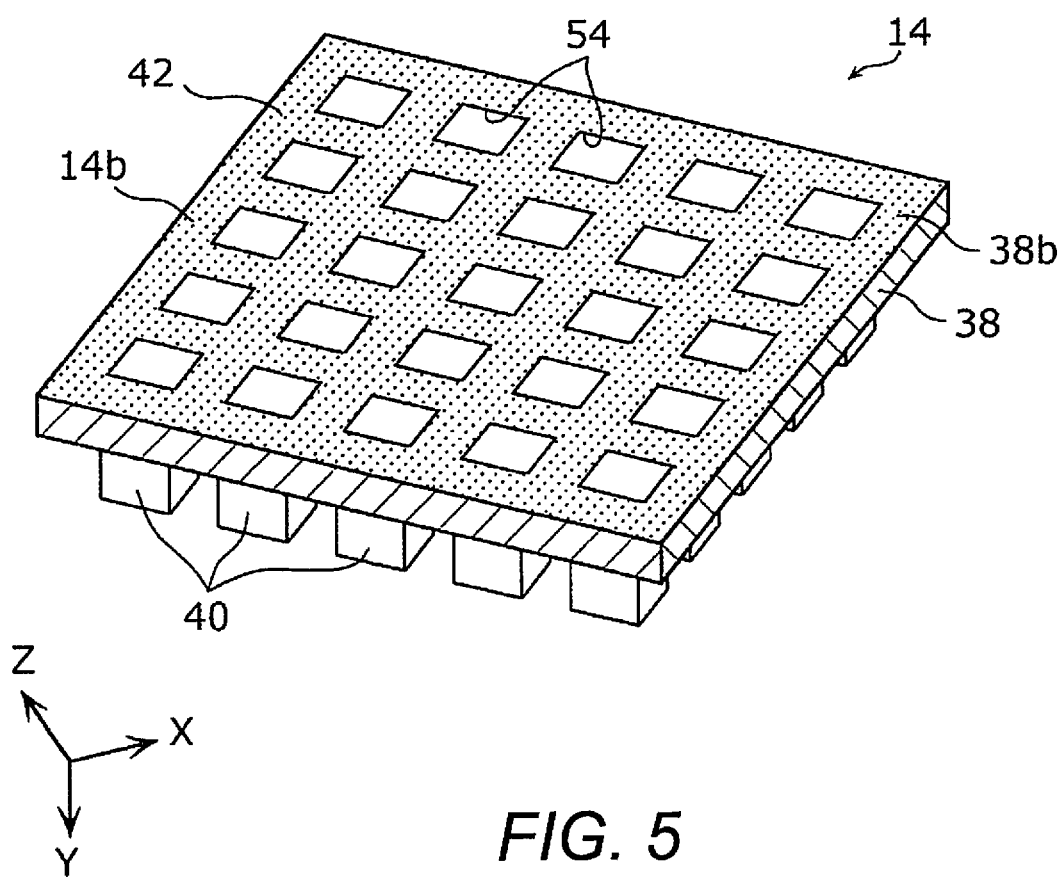
FIG. 5 is a cross-sectional perspective view in which part of the exit face side of the imaging optical panel pertaining to the first embodiment has been cut out.

Next, the configuration of the imaging optical panel 14 pertaining to the first embodiment will now be described through reference to FIGS. 3 to 5. FIG. 3 is a diagram of the exit face 14b side of the imaging optical panel 14. FIG. 4A is a cross-sectional perspective view in which part of the incident face 14a side of the imaging optical panel 14 has been cut out. FIG. 4B is a perspective view of a dihedral corner reflector 40 of the imaging optical panel 14. FIG. 5 is a cross-sectional perspective view in which part of the exit face 14b side of the imaging optical panel 14 has been cut out.

As shown in FIGS. 3 to 5, the imaging optical panel 14 is a dihedral corner reflector array. The imaging optical panel 14 (dihedral corner reflector array) has a base component 38, a plurality of dihedral corner reflectors 40, and a light blocking layer 42.

The base component 38 is formed in a flat shape. The base component 38 has a first main face 38a and a second main face 38b that is disposed on the opposite side from the first main face 38a. The second main face 38b of the base component 38 functions as the exit face 14b of the imaging optical panel 14. In the illustrated embodiment, the base component 38 is formed as a translucent plate that is made of resin or glass, for example, as needed and/or desired.

As shown in FIG. 4A, the plurality of dihedral corner reflectors 40 are arranged relative to each other in an array on the first main face 38a of the base component 38. Each of the dihedral corner reflectors 40 is a micro mirror formed in a cuboid shape. The length of one side of a dihedral corner reflector 40 is, for example, 0.1 to 1 mm. As shown in FIG. 4B, a first reflecting surface 44a and a second reflecting surface 44b are respectively formed on two adjacent side faces 40a and 40b of each of the dihedral corner reflectors 40. The first reflecting surface 44a and the second reflecting surface 44b are disposed perpendicular to each other along the image formation plane 32. The top face 40c of each of the dihedral corner reflectors 40 functions as the incident face 14a of the imaging optical panel 14. In FIG. 3, the first reflecting surface 44a of each of the dihedral corner reflectors 40 and the second reflecting surface 44b of each of the dihedral corner reflectors 40 are depicted by a plurality of broken lines that intersect in a mesh pattern. In the illustrated embodiment, the imaging optical panel 14 is a flat plate formed from a translucent resin material, for example. Of course, the imaging optical panel 14 can be made of different materials, as needed and/or desired. In particular, the dihedral corner reflector array can be made of combination of glass and resin, for example. In particular, the dihedral corner reflectors 40 can be made of glass prisms, for example.

Also, as indicated by the arrow 46 in FIG. 4B, out of the light incident on the top face 40c (the incident face 14a of the imaging optical panel 14) of the dihedral corner reflector 40 (the light that represents the image from the display surface 28), light reflected (total reflection) once by the first reflecting surface 44a and once by the second reflecting surface 44b (twice in total) is emitted from the bottom face 40d of the dihedral corner reflector 40 (the exit face 14b of the image forming optical panel 14) and contributes to the formation of the aerial image 4. Thus, the imaging optical panel 14 forms the aerial image 4 by reflecting the light by both the first reflection surface 44a and the second reflection surface 44b. On the other hand, as indicated by the arrow 48 in FIG. 4B, out of the light incident on the top face 40c of the dihedral corner reflector 40, light reflected only by either the first reflecting surface 44a or the second reflecting surface 44b (once in total) is emitted from the bottom face 40d of the dihedral corner reflector 40 and becomes unnecessary light that does not contribute to the formation of the aerial image 4. If there are no louver film 16 (discussed below), this unnecessary light forms ghost images 36 apart from the aerial image 4 (the real image), as shown in FIG. 1. The ghost images 36 are formed at positions in left and right symmetry with respect to the aerial image 4, for example, within the viewing angle of the aerial image 4, and can be seen by the user 18. More specifically, the ghost image 36 on the left side formed by light reflected a total of once by just the first reflecting surface 44a and the ghost image 36 on the right side formed by light reflected a total of once by just the second reflecting surface 44b are formed at positions in left and right symmetry with respect to the aerial image 4.

Also, as shown in FIG. 3, the first reflecting surfaces 44a and the second reflecting surfaces 44b are each inclined at an angle R with respect to the median plane 52 including a perpendicular 34 of the display surface 28 and a perpendicular 50 of the image formation plane 32. As indicated by the two-dot chain line in FIG. 2, the median plane 52 is a virtual plane parallel to the YZ plane. The angle R is preferably from 30° to 60°, and more preferably 45°. This makes it possible to efficiently separate the incident angle of the light forming the aerial image 4 from the incident angle of the light forming the ghost images 36, out of the light incident on the incident face 14a of the imaging optical panel 14. In this embodiment, the display surface 28 and the image formation plane 32 are both flat. However, if the display surface 28 and the image formation plane 32 are each a curved surface, then the median plane 52 is a plane including the normal line of the display surface 28 and the normal line of the image formation plane 32.

As shown in FIG. 5, the light blocking layer 42 is, for example, formed from a light blocking or opaque material and covers the second main face 38b of the base component 38 except in those areas corresponding to the bottom faces 40d of the dihedral corner reflectors 40. That is, the light blocking layer 42 is a masking with rectangular openings 54 formed in the light blocking layer 42. The rectangular openings 54 allow light that has been reflected once by the first reflecting surfaces 44a and once by the second reflecting surfaces 44b (a total of twice) of the dihedral corner reflectors 40 to pass through the imaging optical panel 14.

Consequently, the light reflected just once, by either the first reflecting surfaces 44a or the second reflecting surfaces 44b of the dihedral corner reflectors 40, is blocked by the light blocking layer 42, and does not come out from the exit face 14b of the imaging optical panel 14. As a result, it is less likely that the above-mentioned unnecessary light will be generated. Also, since the surface area of the part of the exit face 14b of the imaging optical panel 14 where the external light is reflected is reduced correspondingly by the formation of the light blocking layer 42, it is less likely that external light as seen from the user 18 side will be visible.

1-3. Structure of Louver Film

Figure 6:
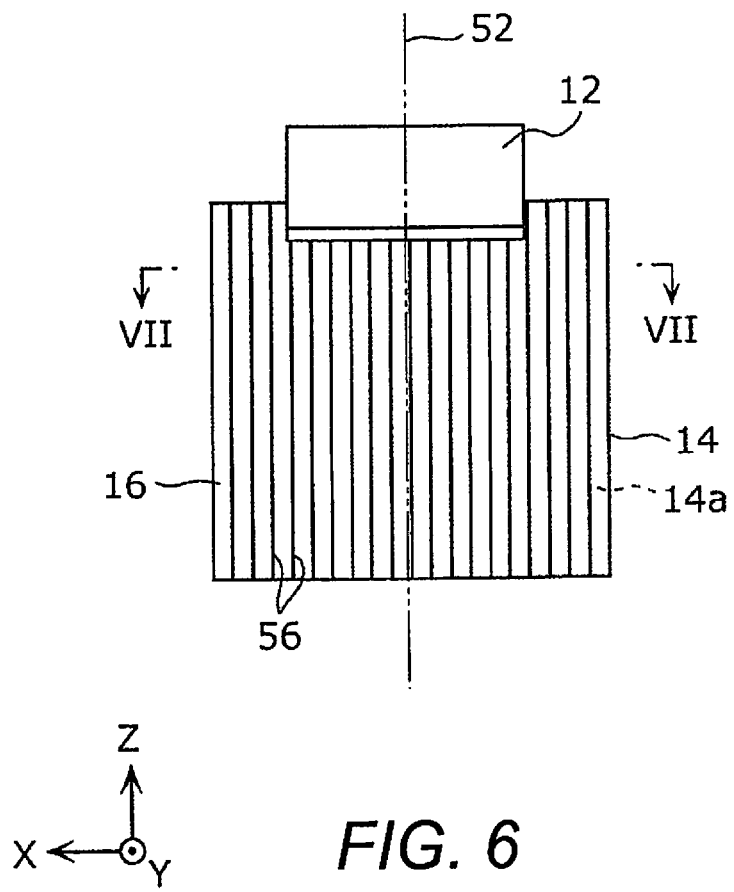
FIG. 6 is a diagram of the incident face side of the imaging optical panel pertaining to the first embodiment.
Figure 7:
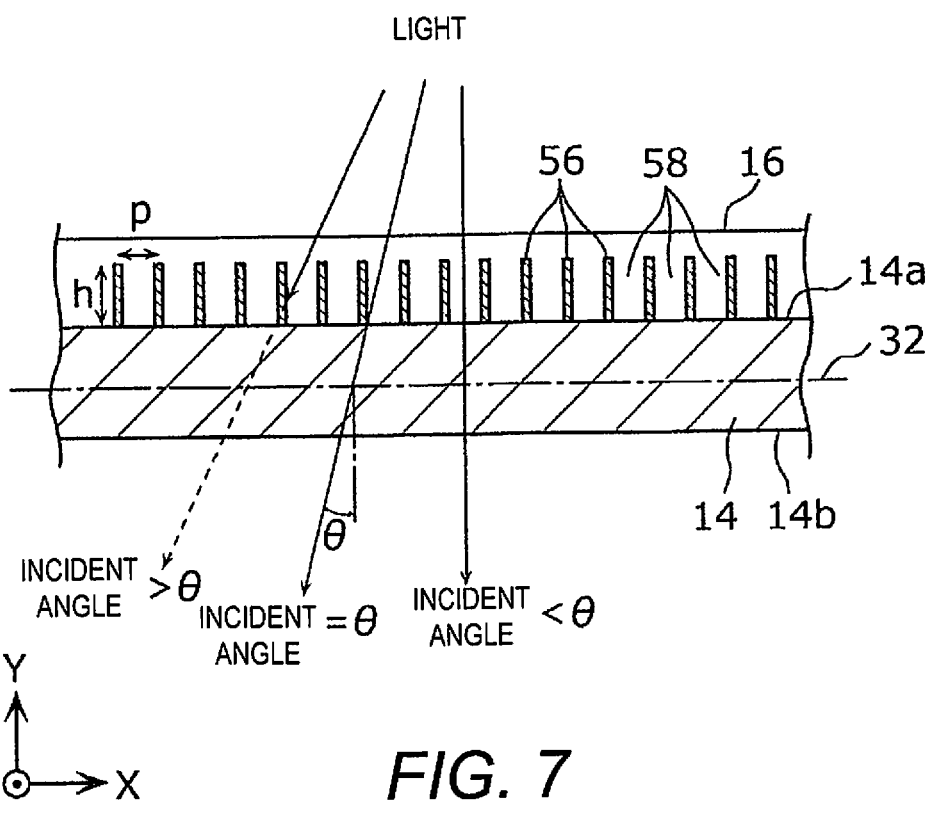
FIG. 7 is a cross sectional view of the louver film pertaining to the first embodiment, taken along VII-VII line in FIG. 6.

Next, the configuration of the louver film 16 pertaining to the first embodiment will be described through reference to FIGS. 6 and 7. FIG. 6 is a diagram of the incident face 14a side of the imaging optical panel 14. FIG. 7 is a cross sectional view of the louver film 16 along VII-VII line in FIG. 6.

As shown in FIG. 7, the louver film 16 has a louver structure. More specifically, the louver film 16 has a plurality of light blocking parts 56 and a plurality of translucent parts 58. The light blocking parts 56 extend in a slender shape along the Z axis direction (an example of a first direction) parallel to the median plane 52. The light blocking parts 56 are disposed spaced apart from each other in the X axis direction (an example of a second detection) that is perpendicular to the median plane 52. The light blocking parts 56 are a masking formed from a light blocking or opaque material. Also, the translucent parts 58 are disposed in between pairs of adjacent light blocking parts 56 of the light blocking parts 56. The translucent parts 58 are formed from a translucent material. In FIG. 6, the light blocking parts 56 are represented by solid lines arranged in parallel.

As shown in FIG. 7, the louver film 16 limits the incident angle of the light (incident light) incident on the incident face 14a of the imaging optical panel 14 in the X axis direction (perpendicular to the median plane 52) to a limit angle θ or less. Here, if we let p be the spacing of the light blocking parts 56 and let h be the height of each of the light blocking parts 56, then the limit angle θ satisfies the relational expression of tan θ=p/h. That is, the spacing p and the height h should be appropriately set so that the limit angle θ will be the desired angle. The limit angle θ is 30°, for example.

As shown in FIG. 7, of the light incident on the louver film 16, light having an incident angle at or below the limit angle θ passes through the translucent parts 58 and is incident on the incident face 14a of the imaging optical panel 14. The light incident on the incident face 14a is reflected once by the first reflecting surfaces 44a and once by the second reflecting surfaces 44b of the dihedral corner reflectors 40 (a total of twice), after which it exits from the exit face 14b of the imaging optical panel 14 to form the aerial image 4.

On the other hand, of the light incident on the louver film 16, light having an incident angle greater than the limit angle θ is blocked by the light blocking parts 56 and therefore is not incident on the incident face 14a of the imaging optical panel 14. If the louver film 16 are not there, then light having an incident angle greater than the limit angle θ will be reflected just once, by either the first reflecting surfaces 44a or the second reflecting surfaces 44b of the dihedral corner reflectors 40, after which it exits from the exit face 14b of the imaging optical panel 14 to become unnecessary light and form ghost images 36. In this embodiment, of the light incident on the louver film 16, light having an incident angle greater than the limit angle θ is removed by the louver film 16. Thus, it is less likely that unnecessary light will be generated and cause ghost images 36.

In this embodiment, the light blocking parts 56 are spaced apart from each other in the X axis direction, which is perpendicular to the median plane 52. However, the present invention is not limited to this. It is also possible for the light blocking parts 56 to be spaced apart in a direction that is inclined with respect to the X axis direction.

1-4. Effect

The effect obtained with the above-mentioned aerial image display device 2 will now be described through reference to FIGS. 8A to 9D.

Figure 8A:
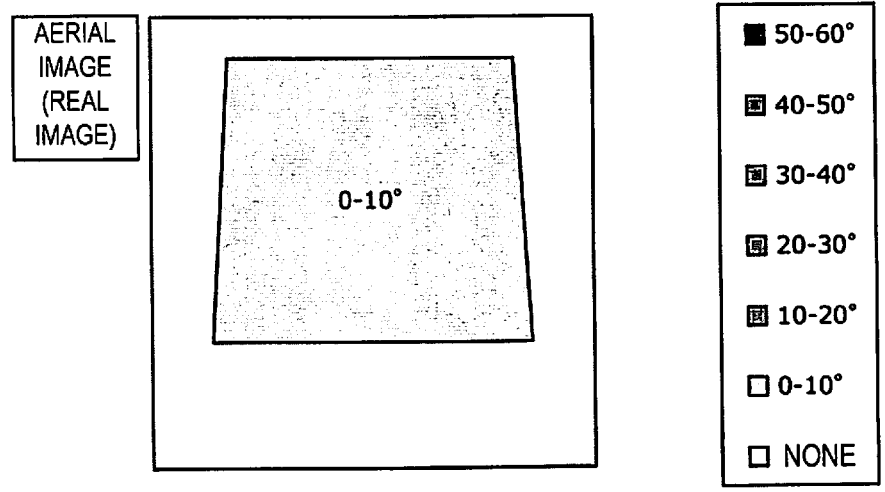
FIGS. 8A and 8B are simulation maps showing the distribution of incident angles of light incident on the incident face of the imaging optical panel.
Figure 8B:
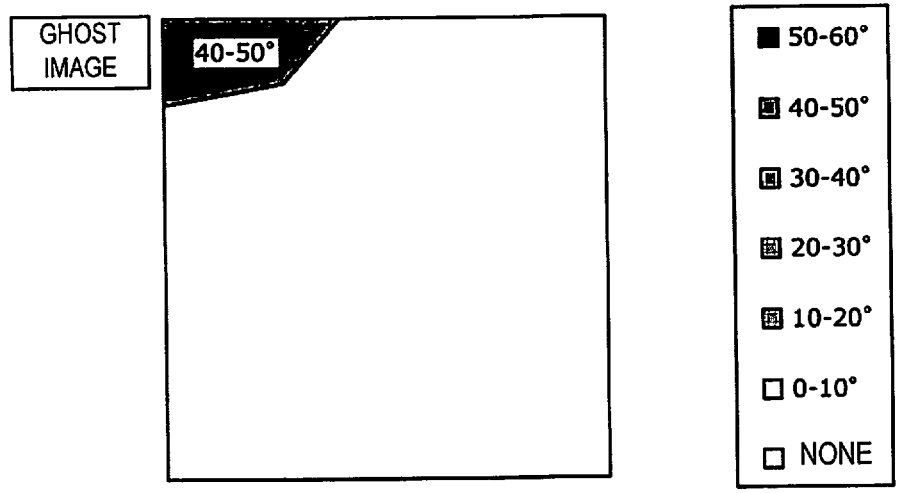

FIGS. 8A and 8B are simulation maps showing the distribution of incident angles of light incident on the incident face 14a of the imaging optical panel 14. FIG. 8A is a simulation map showing the distribution of incident angles of the light that forms the aerial image 4 (real image). FIG. 8B is a simulation map showing the distribution of incident angles of the light that forms the ghost images 36. As described above, a ghost image 36 is formed on the left side of the aerial image 4, and a ghost image 36 is also formed on the right side, but for the purposes of this description, the distribution of incident angles of the light that forms the ghost image 36 on the right side of the aerial image 4 is not shown in FIG. 8B.

FIGS. 9A, 9B, 9C and 9D are simulation maps showing the distribution of incident angles of the light that forms the ghost images 36 when the angle R of the first reflecting surfaces 44a of the imaging optical panel 14 with respect to the median plane 52 is varied. FIGS. 9A, 9B, 9C and 9D are simulation maps showing the distribution of incident angles of the light that forms the ghost images 36 when the angle R is 20°, 30°, 45°, and 60°, respectively. As described above, a ghost image 36 is formed on the left side of the aerial image 4 and another ghost image 36 is formed on the right side. For the purposes of this description, the distribution of incident angles of the light that forms the ghost image 36 on the right side of the aerial image 4 is not shown in FIGS. 9C and 9D.

In the simulation maps shown in FIGS. 8A to 9D, in the aerial image display device 2 having the configuration shown in FIG. 2 (except for the louver film 16), the distance L between the image formation plane 32 and the display surface 28 is 70 mm, the angle T formed by the image formation plane 32 and a perpendicular 34 of the display surface 28 is 45°, and the size of the imaging optical panel 14 is 120 mm×120 mm. In the simulation map shown in FIGS. 8A and 8B, the angle R of the first reflecting surfaces 44a of the imaging optical panel 14 with respect to the median plane 52 is 45°.

As shown in FIG. 8A, the light that forms the aerial image 4 is light having an incident angle of 0° to 10° out of the all light incident on the incident face 14a of the imaging optical panel 14. On the other hand, as shown in FIG. 8B, the light that forms the ghost images 36 is light having an incident angle of 40° to 50° out of all the light incident on the incident face 14a of the imaging optical panel 14.

Therefore, in this embodiment, the incident angle of the light incident on the incident face 14a of the imaging optical panel 14 is limited to, for example, 30° or less by the louver film 16. This allows light having an incident angle greater than 30°, which is the source of the ghost images 36, to be removed by the louver film 16. As a result, the ghost images 36 are less likely to be formed, and the visibility of the aerial image 4 can be enhanced.

Figure 9A:
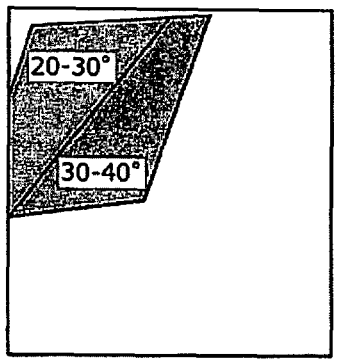
FIGS. 9A, 9B, 9C and 9D are simulation maps showing the distribution of incident angles of light forming ghost images when the angle of the first reflecting surface of the imaging optical panel with respect to the median plane is varied.
Figure 9B:
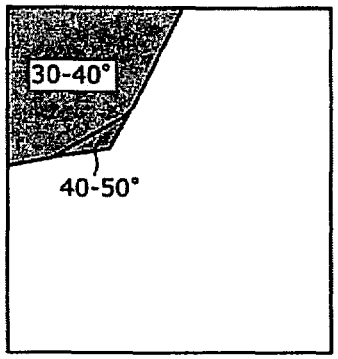
Figure 9C:
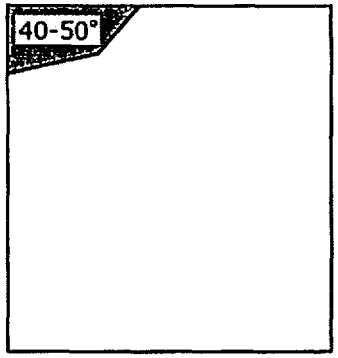
Figure 9D:
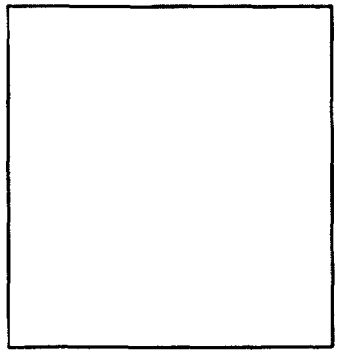

Furthermore, as shown in FIG. 9A, when the angle R is 20°, out of the light incident on the incident face 14a of the imaging optical panel 14, the distribution of incident angles of the light that forms the ghost images 36 is 20° to 40°, and the separation is poor between the distribution of incident angles of light forming the aerial image 4 (0° to 10°) and the light forming the ghost images 36. On the other hand, as shown in FIGS. 9B to 9D, when the angle R is 30°, 45° and 60°, out of the light incident on the incident face 14a of the imaging optical panel 14, the distribution of the incident angles of the light forming the ghost images 36 is 30° or more, and separation is improved between the distribution of incident angles of the light forming the aerial image 4 (0° to 10°) and the light forming the ghost images 36.

Therefore, in this embodiment, the angle R of the first reflecting surfaces 44a of the imaging optical panel 14 with respect to the median plane 52 is set between 30° and 60°. With this configuration, of the light incident on the incident face 14a of the imaging optical panel 14, the incident angle of the light that forms the aerial image 4 can be efficiently separated from the incident angle of the light that forms the ghost images 36. As a result, it is possible to efficiently separate the aerial image 4 from the ghost images 36.

If the angle R of the first reflecting surfaces 44a with respect to the median plane 52 is greater than 60°, then the angle R' (not shown) of the second reflecting surfaces 44b with respect to the median plane 52 will be less than 30°. At this point, separation of the left ghost image 36 with respect to the aerial image 4 is improved, but separation of the right ghost image 36 with respect to the aerial image 4 worsens. In order to improve the separation of both the left ghost image 36 and the right ghost image 36 with respect to the aerial image 4, the angle R of the first reflecting surfaces 44a with respect to the median plane 52 and the angle R' of the second reflecting surfaces 44b with respect to the median plane 52 are preferably both between 30° and 60°.

Second Embodiment

Figure 10:
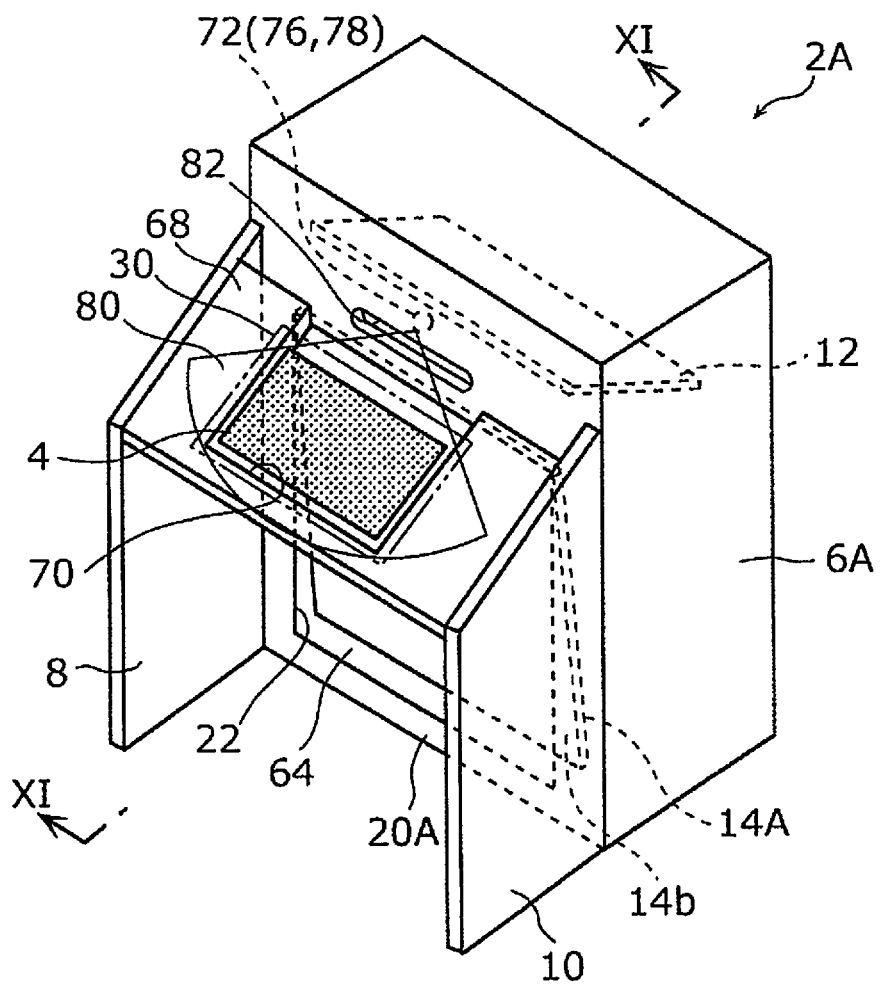
FIG. 10 is a perspective view showing the appearance of the aerial image display device pertaining to a second embodiment.
Figure 11:
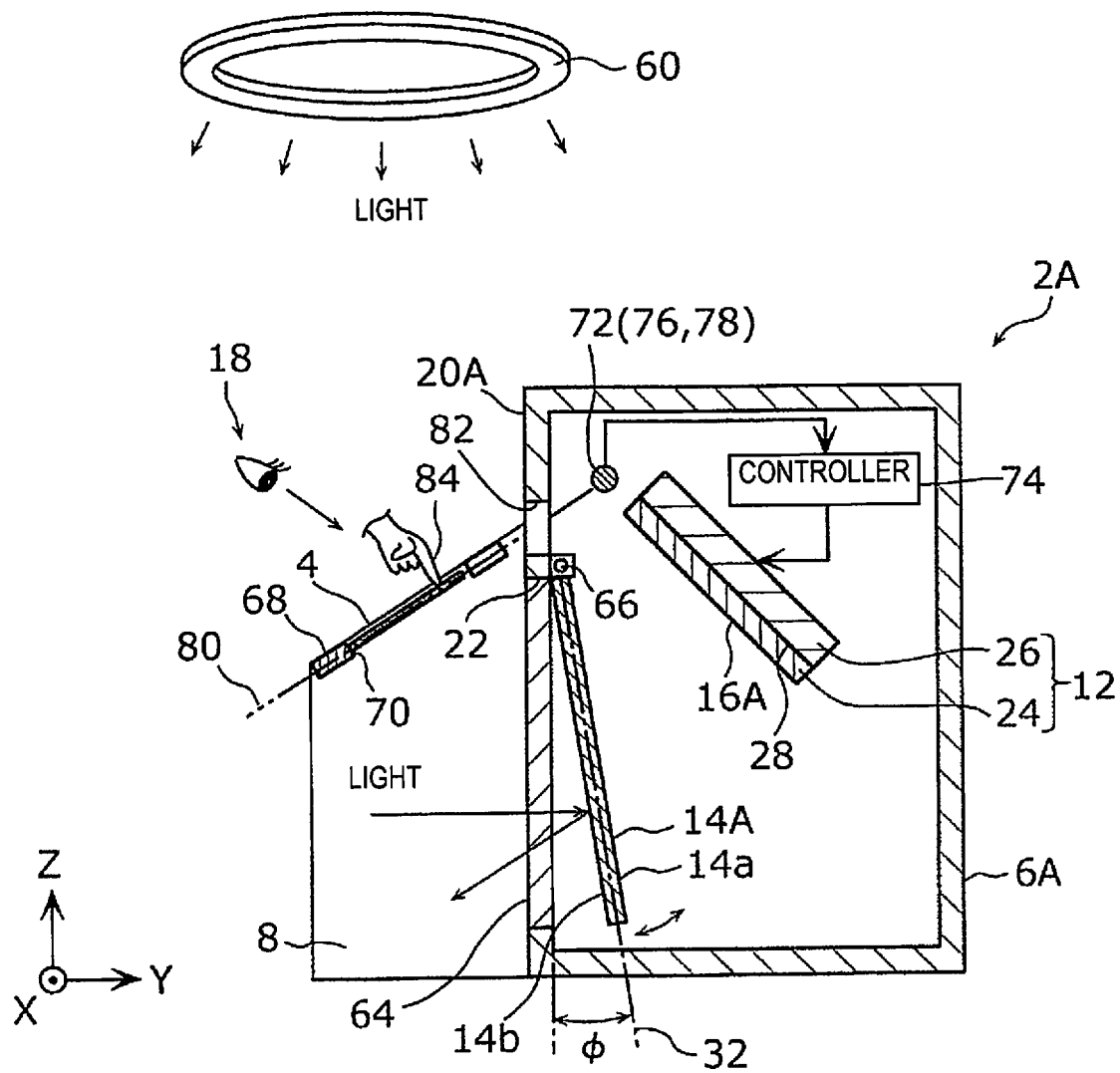
FIG. 11 is a cross sectional view of the aerial image display apparatus pertaining to the second embodiment, taken along the XI-XI line in FIG. 10.
Figure 12:
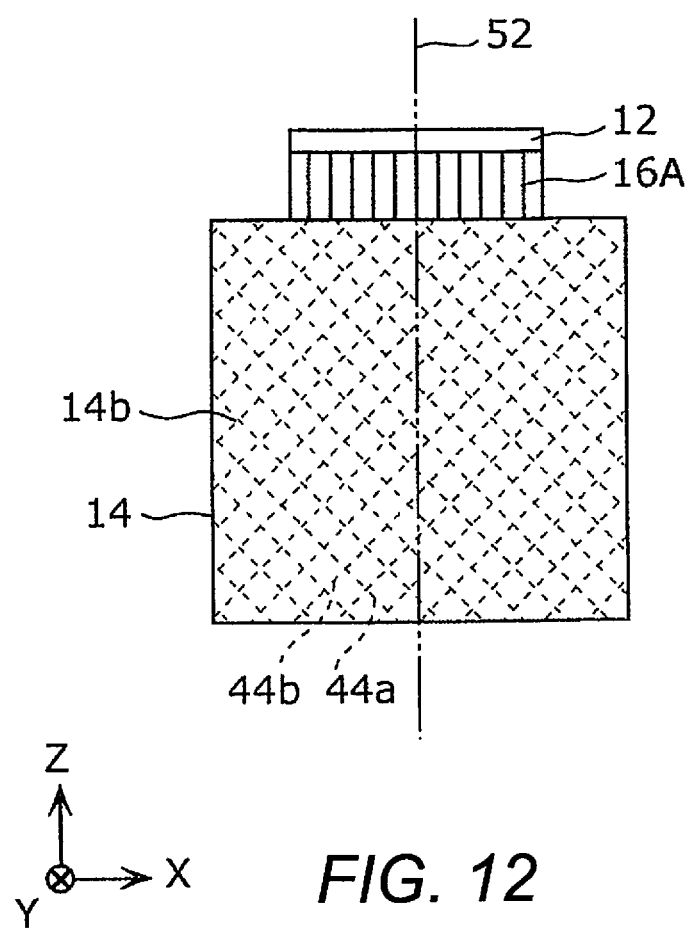
FIG. 12 is a diagram of the exit face side of the imaging optical panel pertaining to the second embodiment.
Figure 13:
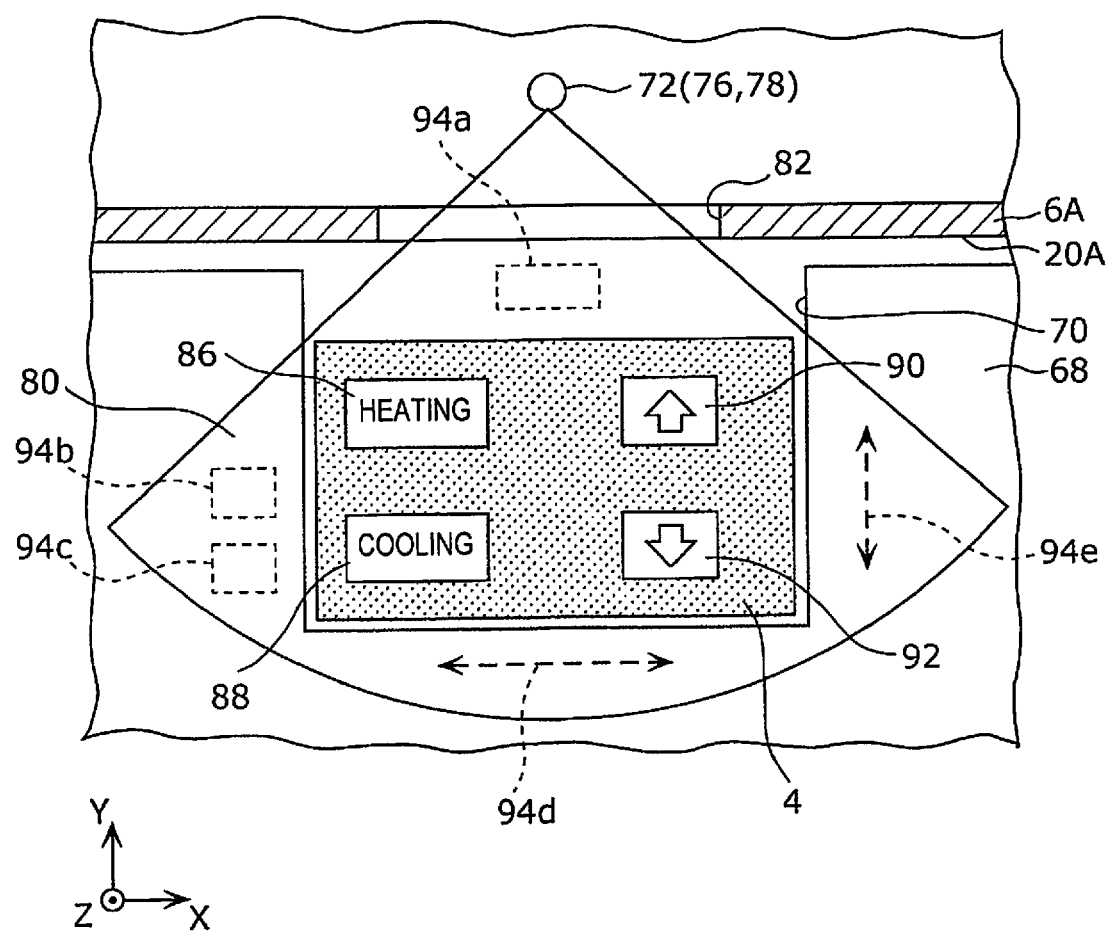
FIG. 13 is an example of an aerial image displayed by the aerial image display device pertaining to the second embodiment.

Next, the aerial image display device 2A pertaining to a second embodiment will be described through reference to FIGS. 10 to 13. FIG. 10 is a perspective view showing the appearance of the aerial image display device 2A. FIG. 11 is a cross sectional view of the aerial image display apparatus 2A along the XI-XI line in FIG. 10. FIG. 12 is a diagram of the exit face 14b side of an imaging optical panel 14A. FIG. 13 is an example of the aerial image 4 displayed by the aerial image display device 2A. In each of the following embodiments, constituent elements that are the same as in the first embodiment are numbered the same and will not be described again.

As shown in FIGS. 10 and 11, with the aerial image display device 2A, a protective plate 64 is disposed in the opening 22 of a side face 20A of a housing 6A. The protective plate 64 is formed from translucent glass or a resin such as acrylic.

The upper end portion of the imaging optical panel 14A is rotatably supported on the inside of the side face 20A of the housing 6A via a joint, such as hinge 66 (an example of an adjustment mechanism). The hinge 66 is disposed above the opening 22 on the inside of the side face 20A of the housing 6A. Consequently, the image forming optical panel 14A can be tilted toward the display unit 12 with respect to the side face 20A of the housing 6A. With this configuration, the angle φ of the image formation plane 32 with respect to the side face 20A of the housing 6A can be adjusted. The angle φ is preferably in the range of 0° to 45° (range between 0° and 45°). More preferably, the angle φ is in the range of 5° to 35°. If the angle φ is 0°, then the image formation plane 32 of the imaging optical panel 14A is disposed in the vertical direction along the side face 20A of the housing 6A.

If the imaging optical panel 14A is inclined with respect to the side face 20A of the housing 6A, then external light from the lighting fixture 60 installed obliquely above the aerial image display device 2A will not be received from straight ahead. With this configuration, it is less likely that external light will be reflected on the imaging optical panel 14A. Also, the position of the aerial image 4 can be adjusted by inclining the imaging optical panel 14A with respect to the side face 20A of the housing 6A. In particular, if the angle φ is set within a range of 5° to 35°, then the user 18 will be able to look down on the aerial image 4 from above in a standing posture without stooping over.

As shown in FIGS. 11 and 12, with the aerial image display device 2A, a louver film 16A is disposed at a position covering the display surface 28 of the display panel 24. The configuration of the louver film 16A is the same as that of the louver film 16 in the first embodiment. With a disposition such as this, just as in the first embodiment, the louver film 16A allows the incident angle of light that is incident on the incident face 14a of the imaging optical panel 14A in the X axis direction perpendicular to the median plane 52 (see FIG. 2) to be limited to a limit angle θ (see FIG. 7) or less.

Also, affixing the louver film 16A to the display surface 28 of the display panel 24 minimizes the decrease in image quality caused by optical scattering when light from the display surface 28 passes through the louver film 16A. Furthermore, since the surface area of the display panel 24 is smaller than the surface area of the image forming optical panel 14A, the size of the louver film 16A can be further reduced as compared to the louver film 16 in the first embodiment.

As shown in FIGS. 10 and 11, with the aerial image display device 2A, a frame component 68 spans the upper end portions of a pair of side wall portions 8 and 10 to form an upper panel of the aerial image display device 2A. The frame component 68 is formed in a plate shape and has a rectangular cutaway portion 70. The cutaway portion 70 extends from one side of the frame component 68 (the side closest to the side face 20A of the housing 6A) toward the other side of the frame component 68 (the side farthest from the side face 20A of the housing 6A). The aerial image 4 is formed within the cutaway portion 70. Also, the main face of the frame component 68 is inclined with respect to the horizontal direction (the Y axis direction) and extends parallel to the aerial image 4. Consequently, part of the circumference of the aerial image 4 is surrounded by the frame component 68. Thus, the user 18 can easily ascertain the position of the aerial image 4 by using the cutaway portion 70 of the frame component 68 as a reference.

Also, the aerial image display device 2A not only functions as an aerial display that displays the aerial image 4, but also as an aerial touch panel (VUI) that accepts touch operations from the user 18 on the aerial image 4. As shown in FIGS. 10 and 11, in order to realize a function as an aerial touch panel, a distance sensor 72 and an electronic controller 74 are disposed inside the housing 6A.

The distance sensor 72 has a light emitter 76 (an example of a light source or first light source) and a light receiver 78 (an example of a sensor or first sensor). The light emitter 76 scans an infrared laser (an example of light or first light) in a fan-shaped detection region 80 (an example of a detection region or first detection region) including the display area 30. As shown in FIGS. 10, 11, and 13, an opening 82 through which the infrared laser from the light emitter 76 passes is formed in the side face 20A of the housing 6A. Consequently, the infrared laser from the light emitter 76 is guided to the detection region 80 through the opening 82 in the side face 20A and the cutaway portion 70 of the frame component 68. The distance sensor 72 senses the position of a finger 84 (an example of an object) of the user 18 located in the detection region 80 based on the angle and the time from when the light is emitted from the light emitter 76 until it is reflected by the finger 84 in the detection region 80 and the light receiver 78 receives the reflected light.

The controller 74 is electrically coupled to the distance sensor 72 to obtain the sensing results of the distance sensor 72. The controller 74 determines the position of the finger 84 in the detection region 80 based on the sensing result by the light receiver 78. The controller 74 also controls the image displayed on the display surface 28 of the display panel 24 based on the determination result regarding the position of the finger 84, and transmits a control signal to an external device (not shown). In the illustrated embodiment, the controller 74 is an electronic controller, such as a microcomputer or processor. The controller 74 can further include other conventional components such as an input interface circuit, an output interface circuit, and storage devices, such as a ROM (Read Only Memory) device and a RAM (Random Access Memory) device, flash memory, etc. For example, the internal RAM of the controller 74 stores processing results of the controller 74. The internal ROM of the controller 74 stores the information and programs for various operations. It will be apparent to those skilled in the art from this disclosure that the precise structure and algorithms for the controller 74 can be any combination of hardware and software that will carry out the functions of the aerial image display device 2A as described herein.

In the example shown in FIG. 13, the aerial image 4 is a VUI screen for operating an air conditioner (not shown), serving here as an external device. The aerial image 4 includes, for example, a heating operation button 86 for switching to a heating operation, a cooling operation button 88 for switching to a cooling operation, a temperature increase button 90 for increasing the air conditioning temperature, and a temperature decrease button 92 for decreasing the air conditioning temperature. For example, when the user 18 touches the temperature increase button 90 with the finger 84, the controller 74 determines that the finger 84 is at the position of the temperature increase button 90. Consequently, the controller 74 transmits a control signal to instruct the air conditioner to raise the air conditioning temperature.

As shown in FIG. 13, a plurality of operation areas 94a to 94e may be displayed outside the aerial image 4 in the detection region 80. The light receiver 78 receives and detects the light reflected by the finger 84 of the user 18 present in each of the plurality of operation areas 94a to 94e. The operation areas 94a to 94e are invisible to the user 18, but when the user 18 touches each of the operation areas 94a to 94e with the finger 84, the controller 74 executes the operation assigned to each of the operation areas 94a to 94e.

For example, when the user 18 touches the operation area 94a with the finger 84, an operation menu screen is displayed on the aerial image 4. When the user 18 touches the operation area 94b with the finger 84, the display of the aerial image 4 is enlarged. When the user 18 touches the operation area 94c with the finger 84, the display of the aerial image 4 is reduced in magnification. When the user 18 swipes the operation area 94d in the lateral direction (X axis direction) with the finger 84, the aerial image 4 scrolls in the lateral direction. When the user 18 swipes the operation area 94e in the vertical direction (Y axis direction) with the finger 84, the aerial image 4 scrolls in the vertical direction.

Although the distance sensor 72 is used in this embodiment, a camera, a gesture sensor, or the like may be used in place of the distance sensor 72. Also, in this embodiment, the aerial image 4 is touched with the finger 84 of the user 18. However, instead of the finger 84, the aerial image 4 may be touched with a touch pen or the like.

Also, in this embodiment, the external device is an air conditioner. However, the present invention is not limited to this. The external device may be, for example, a surgical instrument used in a medical situation, a food processing apparatus used in a food factory, or the like. Thus, the aerial image display device 2A can be favorably used in a situation where hygiene is preferable for hygienic reasons to operate the external device without directly touching the touch panel with the hands.

Third Embodiment

Figure 14:
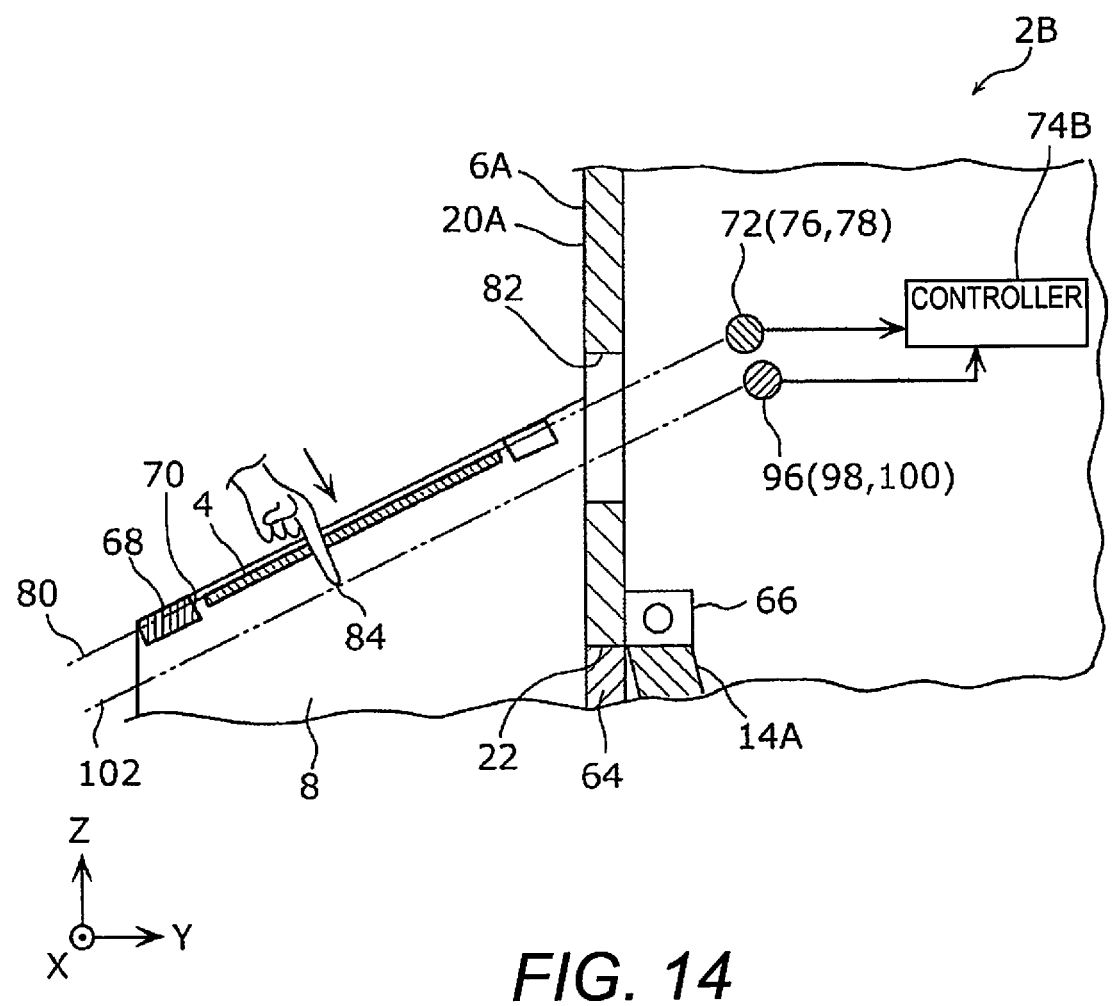
FIG. 14 is a cross sectional view showing a detail view of part of the aerial image display device pertaining to a third embodiment.

Next, an aerial image display device 2B pertaining to a third embodiment will be described through reference to FIG. 14. FIG. 14 is a detail cross sectional view showing a part of the aerial image display device 2B.

As shown in FIG. 14, with the aerial image display device 2B, a distance sensor 96 is disposed inside the housing 6A in addition to the distance sensor 72 of the second embodiment. The distance sensor 96 has a light emitter 98 (an example of a second light source) and a light receiver 100 (an example of a second sensor). The light emitter 98 scans an infrared laser (an example of second light) over a detection region 102 (an example of a second detection region) disposed at a position opposite the lower side of the detection region 80. The infrared laser from the light emitter 98 is guided to the detection region 102 through the opening 82 in the side face 20A of the housing 6A. The light receiver 100 receives and detects the light reflected by the finger 84 of the user 18 (see FIG. 2) that is present in the detection region 102.

The controller 74B determines that the push operation of the finger 84 into the detection region 102 has been performed based on the sensing result by the light receiver 100. The controller 74B also controls the image displayed on the display surface 28 of the display panel 24 (see FIG. 11) when it is determined that the push operation of the finger 84 has been performed, and sends a control signal to the external device (not shown). In the illustrated embodiment, the controller 74B is an electronic controller, such as a microcomputer or processor. The controller 74B can further include other conventional components such as an input interface circuit, an output interface circuit, and storage devices, such as a ROM (Read Only Memory) device and a RAM (Random Access Memory) device, flash memory, etc. For example, the internal RAM of the controller 74B stores processing results of the controller 74B. The internal ROM of the controller 74B stores the information and programs for various operations. It will be apparent to those skilled in the art from this disclosure that the precise structure and algorithms for the controller 74B can be any combination of hardware and software that will carry out the functions of the aerial image display device 2B as described herein.

With the aerial image display device 2B, a so-called hover function can be realized as follows. When the user 18 hovers his finger 84 over the detection region 80, the light receiver 78 receives and detects the light reflected by the finger 84 of the user 18 that is present in the detection region 80. The controller 74B thus determines the position of the finger 84 in the detection region 80 based on the sensing result by the light receiver 78.

After this, when the user 18 pushes his finger 84 in toward the detection region 102, the light receiver 100 receives and detects the light reflected by the finger 84 of the user 18 that is present in the detection region 102. Consequently, the controller 74B determines that the push operation of the finger 84 into the detection region 102 has been performed based on the sensing result by the light receiver 100.

Fourth Embodiment

Figure 15:
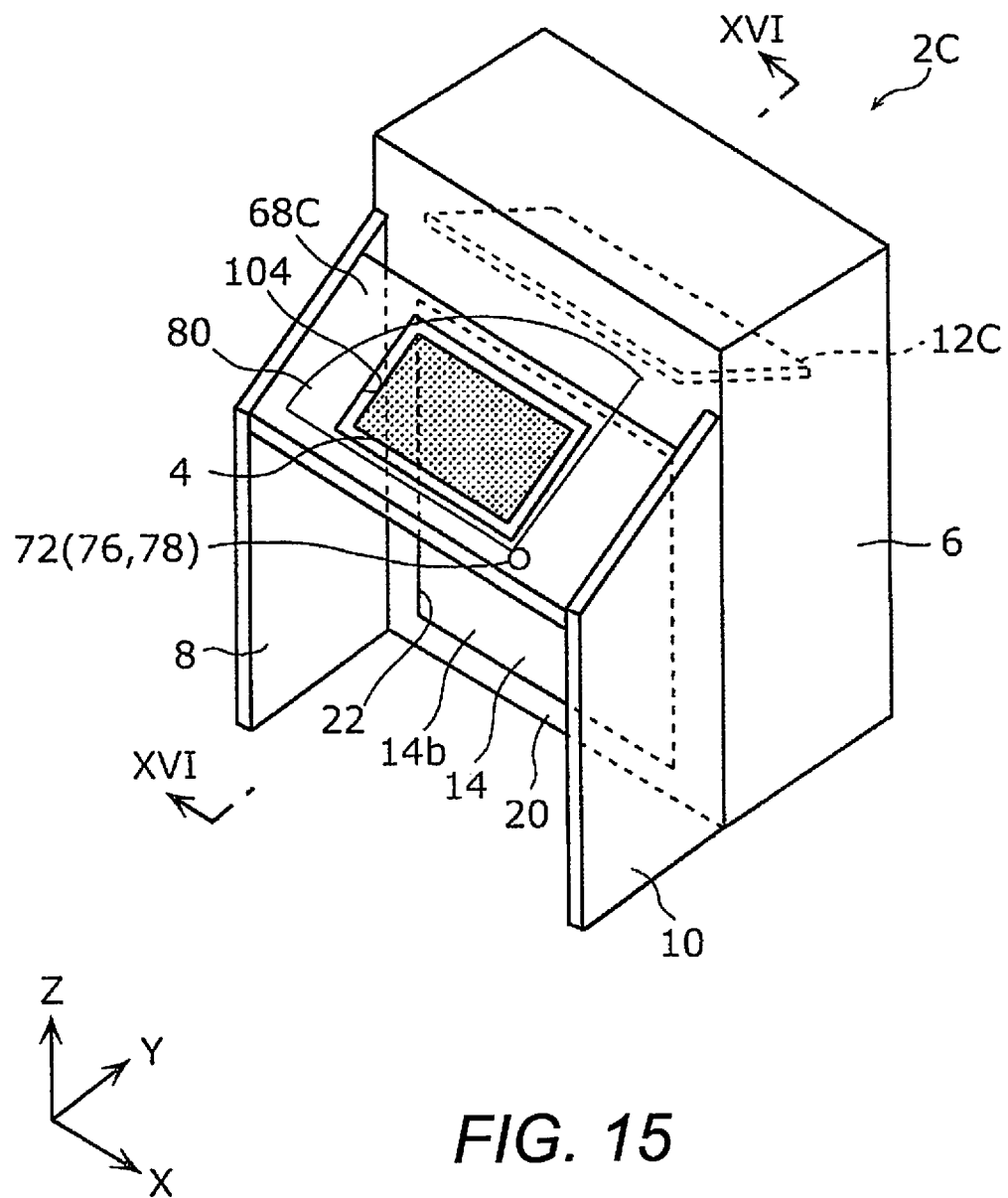
FIG. 15 is a perspective view of the appearance of the aerial image display device pertaining to a fourth embodiment.
Figure 16:
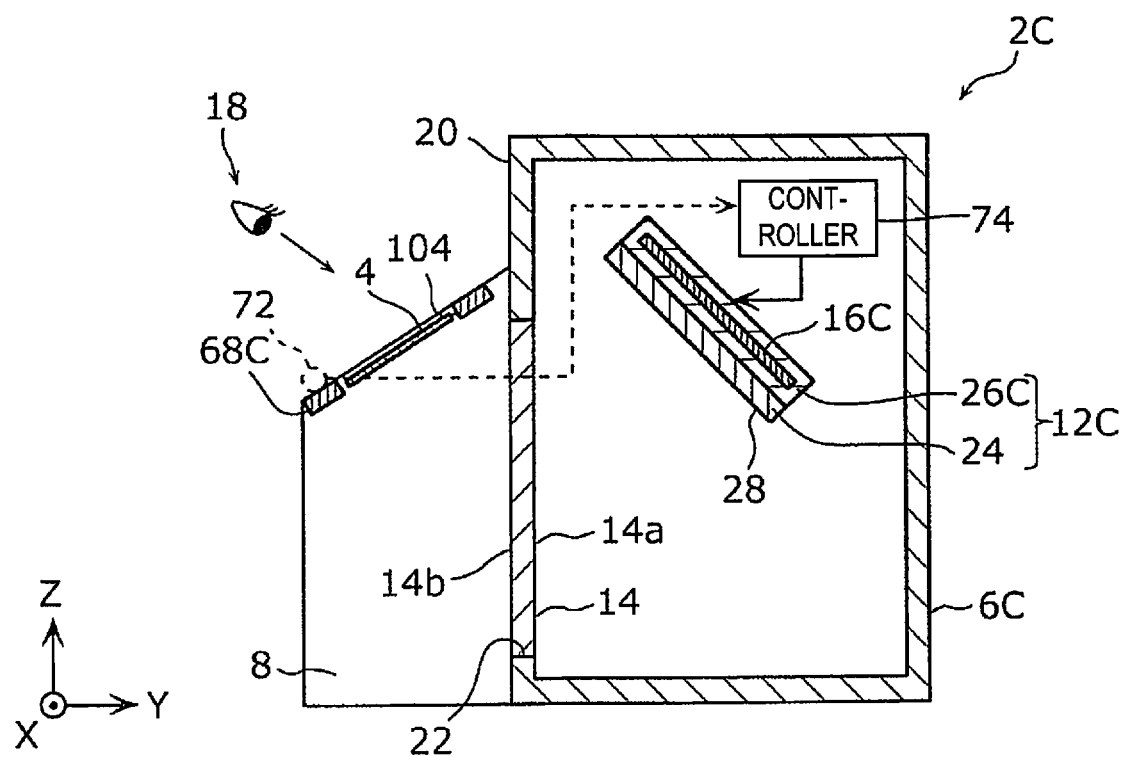
FIG. 16 is a cross sectional view of the aerial image display device pertaining to the fourth embodiment, taken along the XVI-XVI line in FIG. 15.
Figure 17:
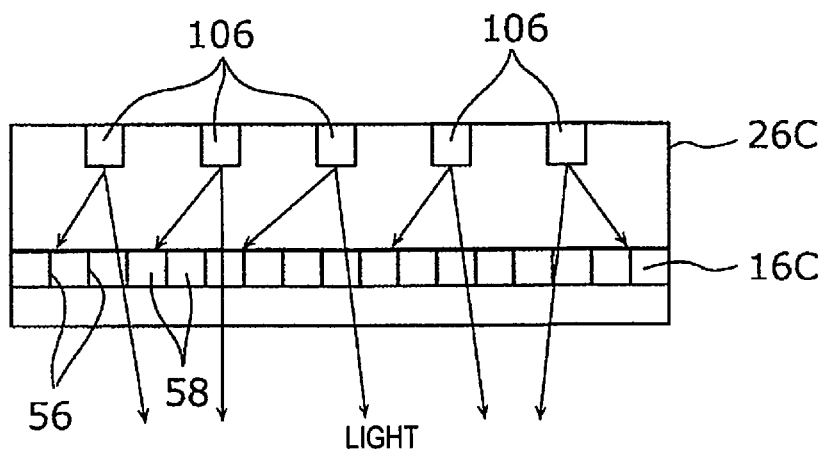
FIG. 17 is a simplified diagram of the internal structure of a backlight pertaining to the fourth embodiment.

The aerial image display device 2C pertaining to a fourth embodiment will now be described through reference to FIGS. 15 to 17. FIG. 15 is a perspective view of the appearance of the aerial image display device 2C. FIG. 16 is a cross sectional view of the aerial image display device 2C along the XVI-XVI line in FIG. 15. FIG. 17 is a simplified diagram of the internal structure of a backlight 26C.

As shown in FIG. 15, with the aerial image display device 2C, a rectangular opening 104 that goes all the way around the aerial image 4 is formed in the frame component 68C in place of the cutaway portion 70 in the second embodiment. This allows the user 18 to more easily ascertain the position of the aerial image 4, using the opening 104 in the frame component 68C as a reference.

As shown in FIG. 15, with the aerial image display device 2C, the distance sensor 72 (including the light emitter 76 and the light receiver 78) is disposed in a corner of the opening 104 of the frame component 68C. Consequently, even if the distance between the aerial image 4 and the distance sensor 72 is reduced, the aerial image 4 can be included in the detection region 80 of the distance sensor 72. As a result, the size of the aerial image display device 2C can be kept small.

As shown in FIGS. 16 and 17, with the aerial image display device 2C, the louver film 16C is disposed inside the backlight 26C of the display unit 12C. The backlight 26C comprises a plurality of light emitting elements 106. The louver film 16C is disposed opposite the light emitting elements 106. The configuration of the louver film 16C is the same as that of the louver film 16 in the first embodiment. With this layout, just as in the first embodiment, the louver film 16C limits the exit angle of the light emitted from the backlight 26C in the X axis direction perpendicular to the median plane 52 (see FIG. 2) to be the limit angle or less.

Also, disposing the louver film 16C inside the backlight 26C minimizes the deterioration in image quality and the decrease in the amount of light caused by the louver film 16C.

In this embodiment, the louver film 16C is disposed inside the backlight 26C. However, the present invention is not limited to this. For example, the louver film 16C may be disposed on the exit face of the backlight 26C.

Fifth Embodiment

Figure 18:
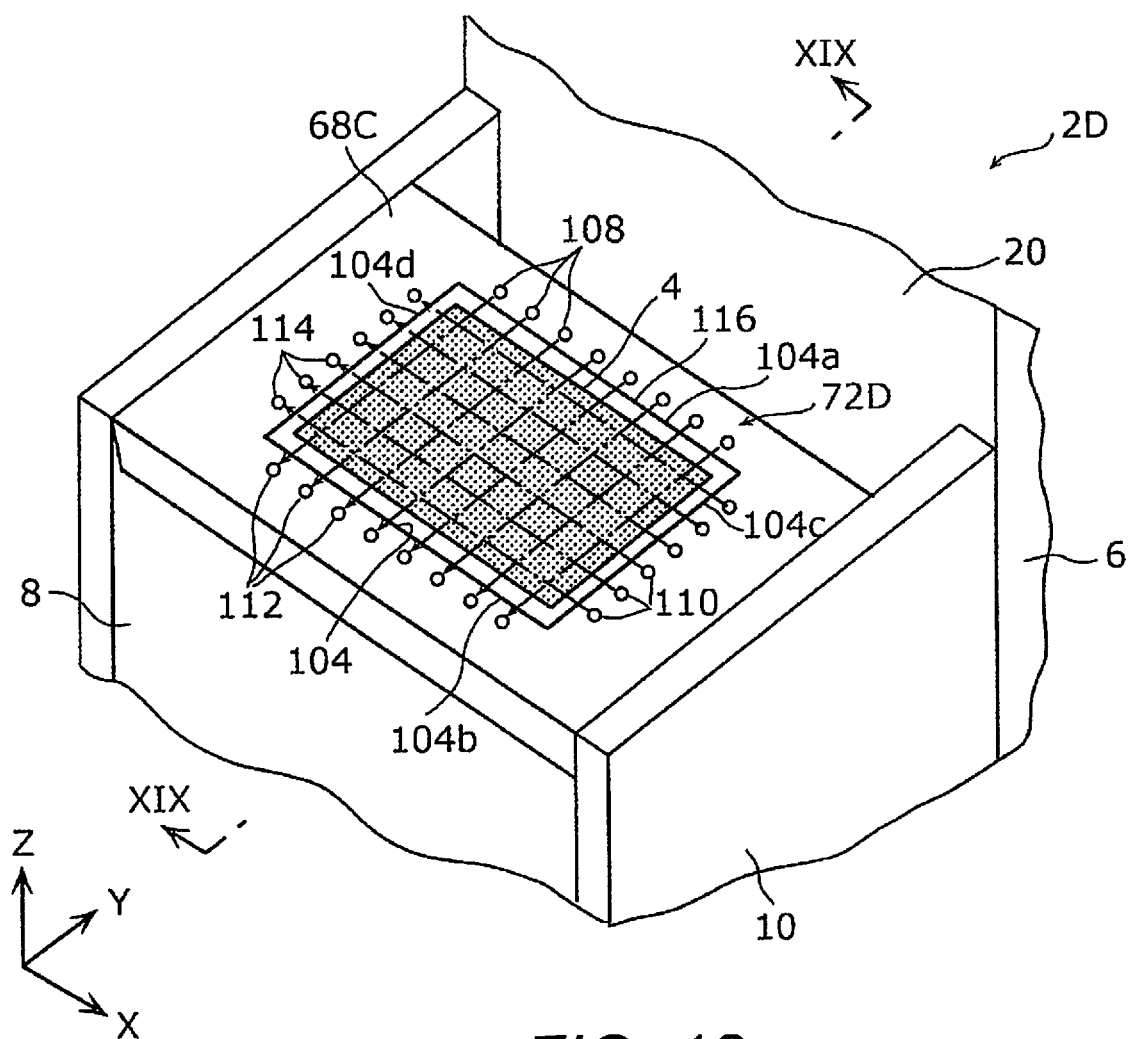
FIG. 18 is a perspective view showing a detail view of part of the aerial image display device pertaining to a fifth embodiment.
Figure 19:
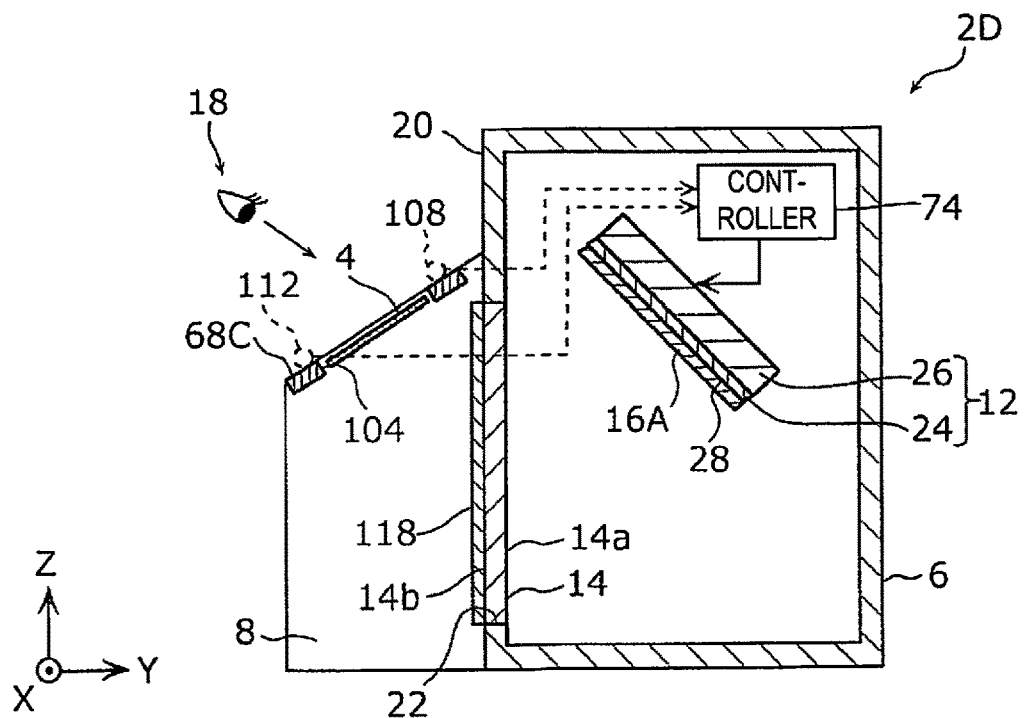
FIG. 19 is a cross sectional view of the aerial image display device pertaining to the fifth embodiment, taken along the XIX-XIX line in FIG. 18.
Figure 20:
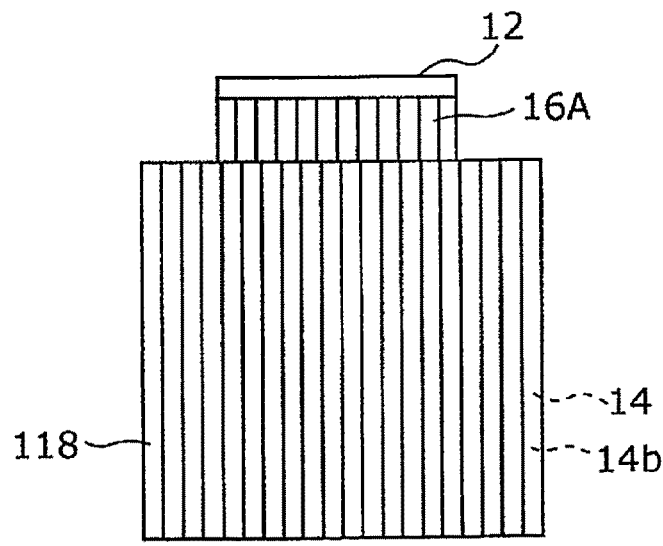
FIG. 20 is a diagram of the exit face side of the imaging optical panel pertaining to the fifth embodiment.

The aerial image display device 2D pertaining to a fifth embodiment will now be described through reference to FIGS. 18 to 20. FIG. 18 is a perspective view showing a detail view of part of the aerial image display device 2D. FIG. 19 is a cross sectional view of the aerial image display device 2D along the XIX-XIX line in FIG. 18. FIG. 20 is a diagram of the exit face 14b side of the imaging optical panel 14.

As shown in FIG. 18, with the aerial image display device 2D, the distance sensor 72D has a plurality of first light emitters 108, a plurality of second light emitters 110, a plurality of first light receivers 112, and a plurality of second light receivers 114.

The first light emitters 108 are disposed spaced apart along a first side 104a of the opening 104 of the frame component 68C. The first light receivers 112 are disposed spaced apart along a second side 104b opposite the first side 104a of the opening 104 of the frame component 68C. That is, the first light emitters 108 are disposed corresponding to the first light receivers 112. The first light emitters 108 linearly direct infrared rays toward the first light receivers 112. The first light receivers 112 receive the infrared rays from the first light emitters 108.

The second light emitters 110 are disposed spaced apart along a third side 104c of the opening 104 of the frame component 68C. The second light receivers 114 are disposed spaced apart along a fourth side 104d opposite the third side 104c of the opening 104 of the frame component 68C. That is, the second light emitters 110 are disposed corresponding to the second light receivers 114. The second light emitters 110 linearly direct infrared rays toward the second light receivers 114. The second light receivers 114 receive the infrared rays from the second light emitters 110.

As described above, the detection region 116 of the distance sensor 72D is formed over substantially the entire area of the opening 104 of the frame component 68C. When the user 18 (see FIG. 11) touches a specific position of the aerial image 4 with his finger 84, the light from the first light emitters 108 and the second light emitters 110 corresponding to this specific position is blocked by the finger 84. Thus, the light is not received by the first light receivers 112 or the second light receivers 114 corresponding to that specific position. The controller 74 determines the position of the finger 84 in the detection region 116 based on the sensing results of the first light receivers 112 and the second light receivers 114.

Even when the user 18 touches the aerial image 4 with two fingers 84 (called multi-touch), the controller 74 can still determine the positions of the two fingers 84 in the detection region 116.

As shown in FIGS. 19 and 20, with the aerial image display device 2D, just as in the second embodiment, the louver film 16A is disposed on the display surface 28 of the display panel 24. Furthermore, a louver film 118 (an example of a second limiter) is disposed on the exit face 14b of the imaging optical panel 14, that is, on the opposite side of the imaging optical panel 14 from the display unit 12. The louver film 118 is an optical film or masking for limiting the exit angle of light (exit light) emitted from the exit face 14b of the imaging optical panel 14, and has the same configuration as that of the louver film 16A. The louver film 118 limits the exit angle of the light emitted from the exit face 14b of the imaging optical panel 14 to be the limit angle or less in the X axis direction perpendicular to the median plane 52 (see FIG. 2).

If the above-mentioned louver film 118 is not provided, then out of the light emitted from the exit face 14b of the imaging optical panel 14, light that has an exit angle greater than the limit angle will form ghost images as unnecessary light. These ghost images are formed at positions in left and right symmetry with respect to the aerial image 4, for example, outside the viewing angle of the aerial image 4, and will be visible to the user 18. If the exit angle of the light emitted from the exit face 14b of the image forming optical panel 14 is limited to the limit angle or less with the louver film 118, then light with an exit angle greater than the limit angle, which causes ghost images, can be removed by the film 118. As a result, ghost images are less likely to be formed outside the viewing angle of the aerial image 4.

Sixth Embodiment

Figure 21:
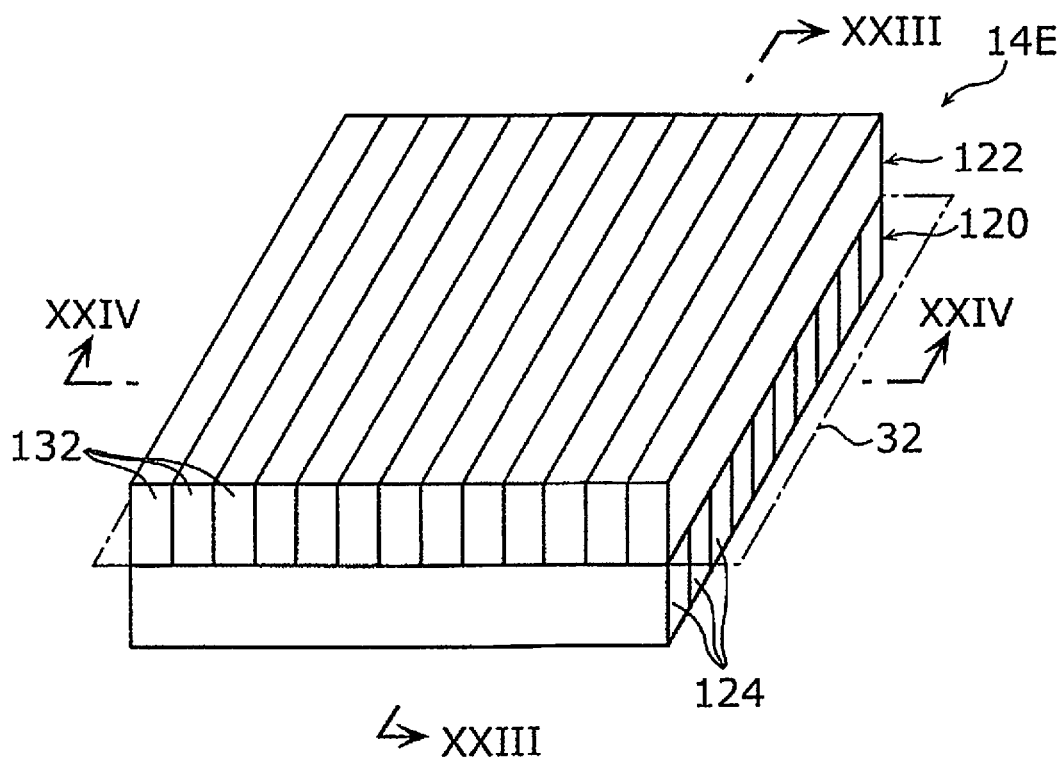
FIG. 21 is a perspective view of the imaging optical panel pertaining to a sixth embodiment.
Figure 22:
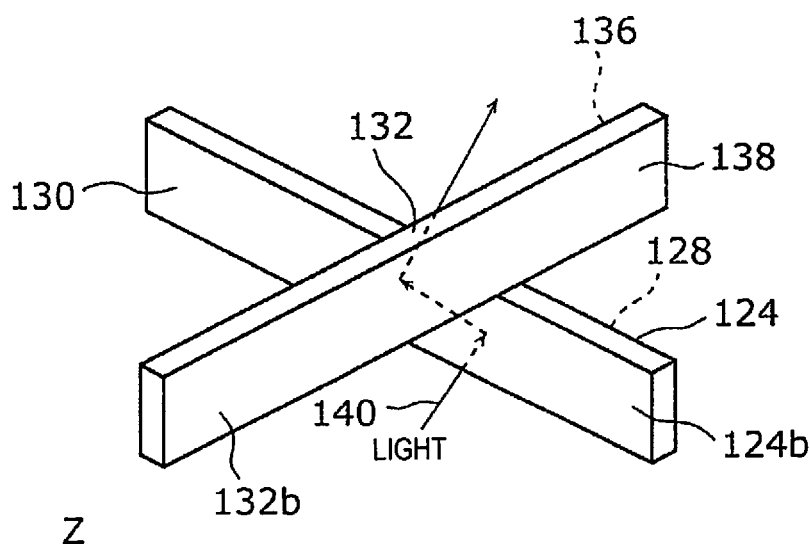
FIG. 22 is a perspective view in which a first translucent plate and a second translucent plate of the imaging optical panel pertaining to the sixth embodiment have been extracted.
Figure 23:
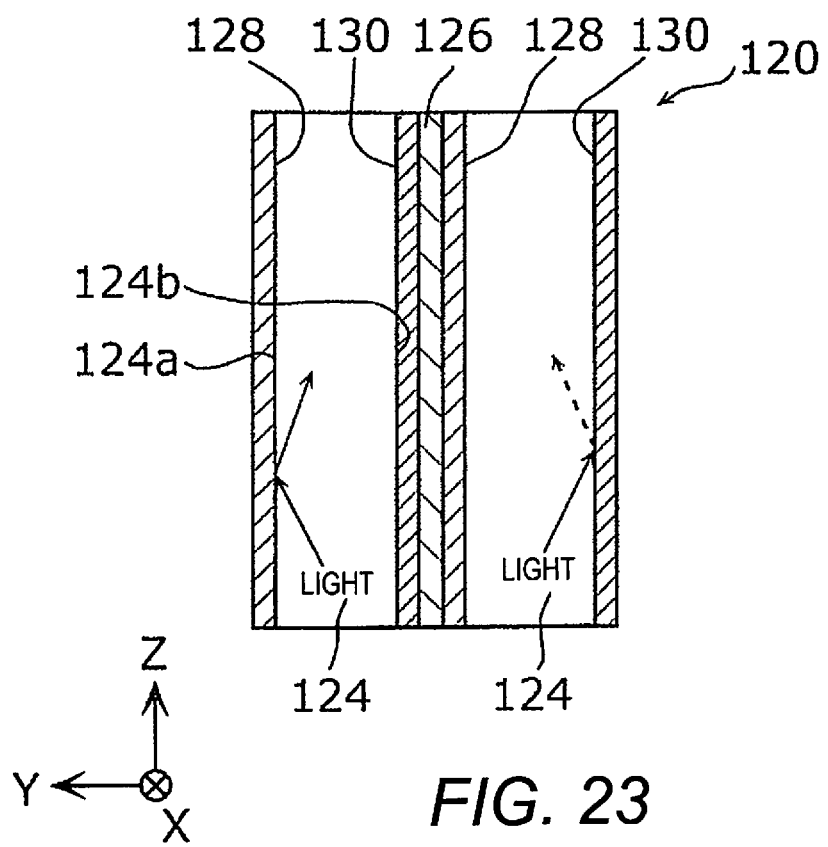
FIG. 23 is a cross sectional view of the main components of the imaging optical panel pertaining to the sixth embodiment, taken along the XXIII-XXIII line in FIG. 21.
Figure 24:
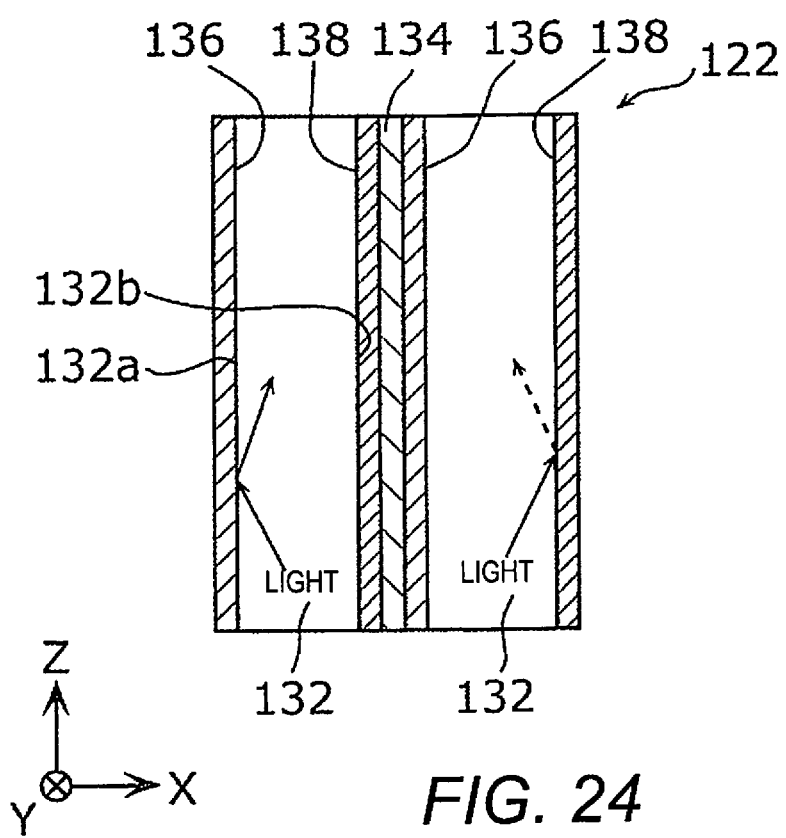
FIG. 24 is a cross sectional view of the main components of the imaging optical panel pertaining to the sixth embodiment, taken along the XXIV-XXIV line in FIG. 21.

The imaging optical panel 14E pertaining to a sixth embodiment will now be described through reference to FIGS. 21 to 24. FIG. 21 is a perspective view of the imaging optical panel 14E. FIG. 22 is a perspective view in which a first translucent plate 124 and a second translucent plate 132 of the imaging optical panel 14E have been extracted. FIG. 23 is a cross sectional view of the main components of the imaging optical panel 14E along the XXIII-XXIII line in FIG. 21. FIG. 24 is a cross sectional view of the main components of the imaging optical panel 14E along the XXIV-XXIV line in FIG. 21. The X, Y, and Z axes in FIGS. 21 to 24 are a coordinate system different from the X, Y, and Z axes in FIGS. 1 to 20.

As shown in FIG. 21, the imaging optical panel 14E has a configuration different from that of the imaging optical panel 14 in the first embodiment. The imaging optical panel 14E has a first light control panel 120 and a second light control panel 122. The first light control panel 120 and the second light control panel 122 are stacked in the Z axis direction. The first light control panel 120 is disposed on the light incident side, and the second light control panel 122 is disposed on the light exit side.

The first light control panel 120 has a plurality of first translucent plates 124. Each of the first translucent plates 124 is a plate extending in a slender shape in the X axis direction, and is formed from glass or the like that is translucent, for example. The first translucent plates 124 are laminated in a first lamination direction, which is the thickness direction of the plates (the Y axis direction). As shown in FIG. 23, the first translucent plates 124 are bonded together via a translucent adhesive layer 126. A first reflecting surface 128 is formed on the first main face 124a of each of the first translucent plates 124. Also, a first light blocking layer 130 is formed on the second main face 124b (the face on the opposite side from the first main face 124a) of each of the first translucent plates 124. The first light blocking layer 130 is formed from a light blocking or opaque material. In a pair of adjacent first translucent plates 124, the first reflecting surface 128 of one of the first translucent plates 124 is bonded to the first light blocking layer 130 of the other first translucent plate 124 via an adhesive layer 126.

The second light control panel 122 has a plurality of second translucent plates 132. Each of the second translucent plates 132 is a plate extending in an elongated shape in the Y axis direction, and is formed from glass or the like that is translucent, for example. The second translucent plates 132 are laminated in a second lamination direction that is perpendicular to the first lamination direction, which is the thickness direction (the X axis direction) of the plates. The second translucent plates 132 are bonded together via a translucent adhesive layer 134. As shown in FIG. 24, a second reflecting surface 136 is formed on the third main face 132a of each of the second translucent plates 132. A second light blocking layer 138 is formed on the fourth main face 132b (the face on the opposite side from the third main face 132a) of each of the second translucent plates 132. The second light blocking layer 138 is formed from a light blocking or opaque material. In a pair of adjacent second translucent plates 132, the second reflecting surface 136 of one of the second translucent plates 132 is bonded to the second light blocking layer 138 of the other second translucent plate 132 via an adhesive layer 134.

As shown in FIGS. 21 and 22, the second translucent plates 132 are disposed so as to be perpendicular to the first translucent plates 124. That is, the first reflecting surface 128 and the second reflecting surface 136 are disposed so as to be perpendicular to each other along the image formation plane 32.

As shown by the arrow 140 in FIG. 22, of the light incident on the first light control panel 120, light that has been reflected twice (total reflection), that is, once by the first reflecting surface 128 and once by the second reflecting surface 136, exits the second light control panel 122 and contributes to the formation of the aerial image 4 (see FIG. 1).

If the first light blocking layer 130 and the second light blocking layer 138 are not provided, then of the light incident on the first light control panel 120, the light reflected by the second main faces 124b of the first translucent plates 124, or by the fourth main faces 132b of the second translucent plates 132 will be emitted from the second light control panel 122 and become unnecessary light that does not contribute to the formation of the aerial image 4.

In this embodiment, the first light blocking layer 130 is formed on the second main faces 124b of the first translucent plates 124, and the second light blocking layer 138 is formed on the fourth main faces 132b of the second translucent plates 132. Consequently, it is less likely that the light incident on the first light control panel 120 will be reflected by the second main faces 124b of the first translucent plates 124 or by the fourth main faces 132b of the second translucent plates 132. Thus, it is less likely that the above-mentioned unnecessary light will be generated.

Seventh Embodiment

Figure 25:
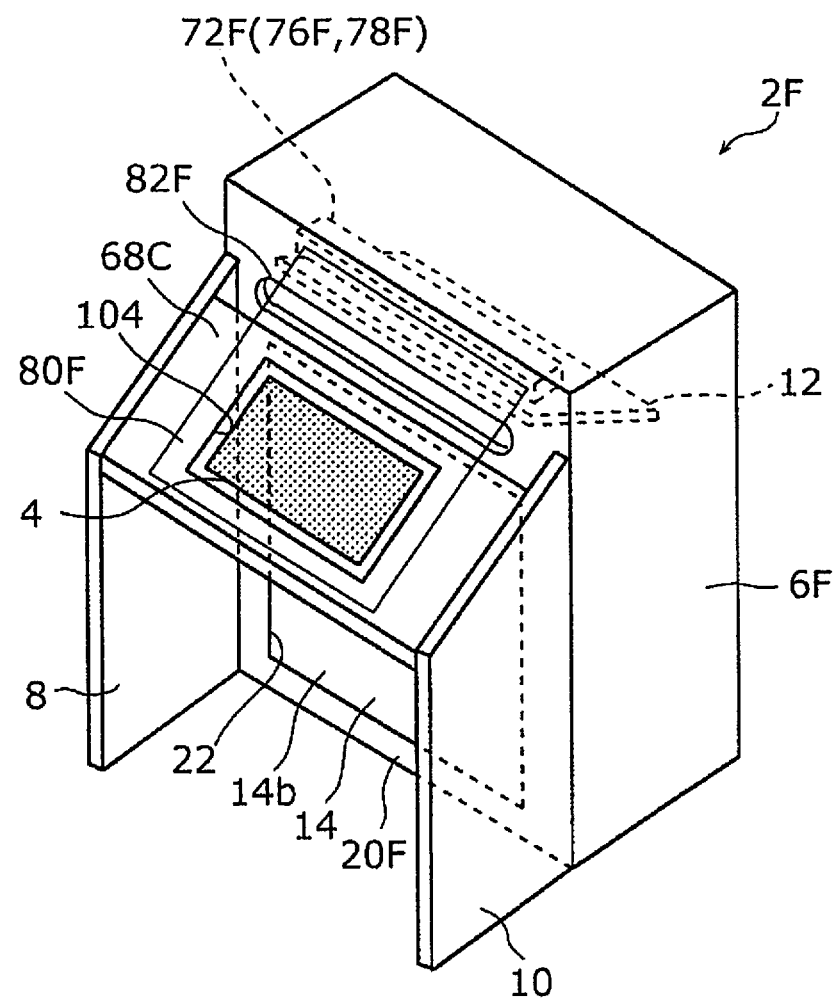
FIG. 25 is a perspective view of the appearance of the aerial image display device pertaining to a seventh embodiment.
Figure 26:
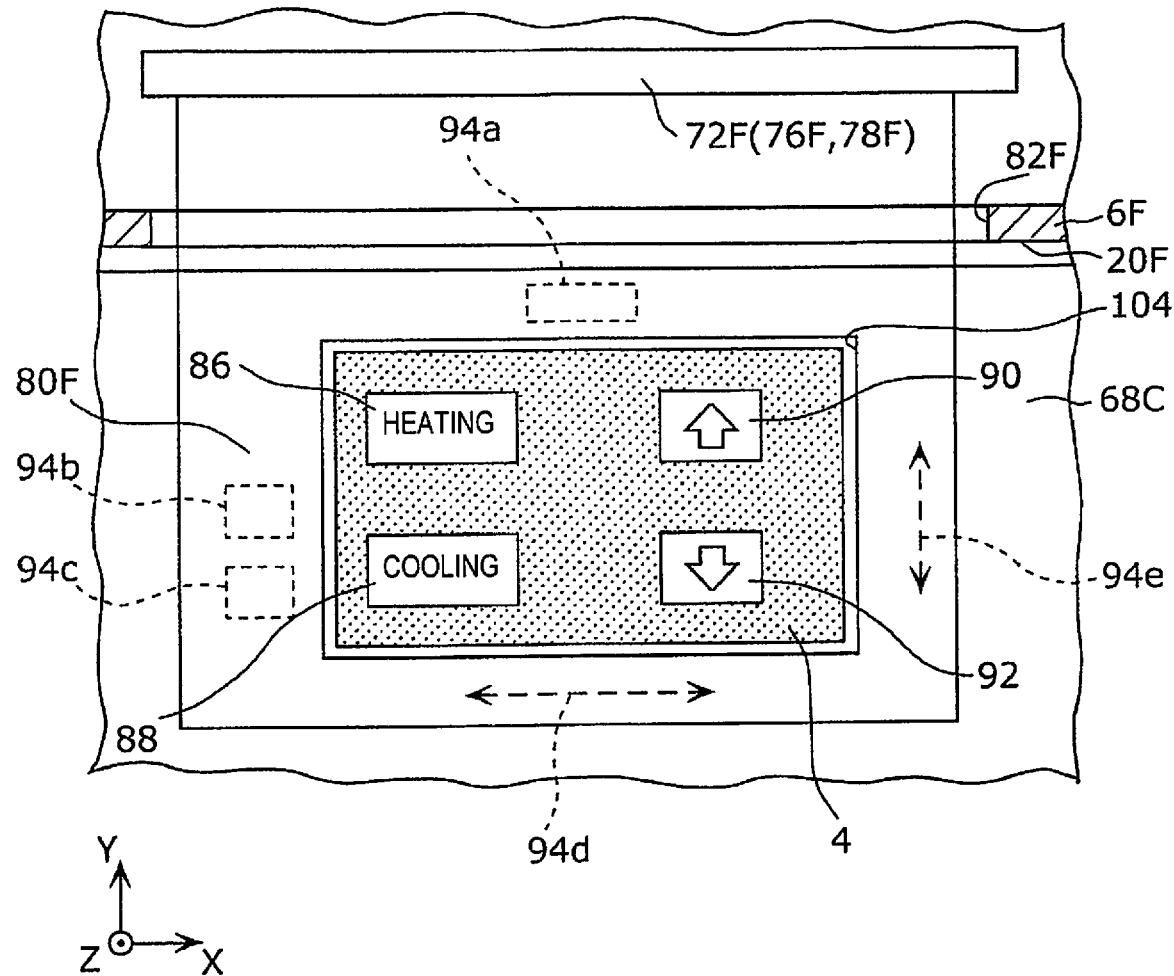
FIG. 26 is an example of an aerial image displayed by the aerial image display device pertaining to the seventh embodiment.

The aerial image display device 2F pertaining to a seventh embodiment will now be described through reference to FIGS. 25 and 26. FIG. 25 is a perspective view of the appearance of the aerial image display device 2F. FIG. 26 is an example of the aerial image 4 displayed by the aerial image display device 2F.

Like the second embodiment, the aerial image display device 2F functions as an aerial touch panel. As shown in FIGS. 25 and 26, a distance sensor 72F disposed inside a housing 6F is a sensor (called an air bar) that is wider than it is tall and extends in the X axis direction. The distance sensor 72F has a light emitter 76F and a light receiver 78F. The light emitter 76F emits infrared rays over a rectangular detection region 80F.

As shown in FIGS. 25 and 26, an opening 82F that is wider than it is tall and is used for transmitting infrared rays from the light emitter 76F is formed in the side face 20F of the housing 6F. Consequently, the infrared rays from the light emitter 76F are guided to the detection region 80F through the opening 82F in the side face 20F. As in the second embodiment, the distance sensor 72F can sense the position of the finger 84 (see FIG. 11) of the user 18 in the detection region 80F.

As shown in FIG. 26, a plurality of operation areas 94a to 94e are displayed outside the aerial image 4 in the detection region 80F, just as in the second embodiment. As described above, since the detection region 80F is formed in a rectangular shape, there is sufficient room in the detection region 80F for the user 18 to swipe or perform other such operations in the operation areas 94d and 94e.

Modification Examples

The aerial image display devices pertaining to the first to seventh embodiments of the present invention are described above. However, the present invention is not limited to or by the first to seventh embodiments. For example, the above embodiments may be combined with each other.

In the above embodiments, the display unit 12 (12C) is formed by the display panel 24 and the backlight 26 (26C). However, this is not the only option. For example, the display unit 12 (12C) can be formed by a projector, an organic EL (electroluminescence) unit, an inorganic EL unit, or the like.

In the above embodiments, the image forming optical panel 14 (14A, 14E) is configured to have a louver structure. However, the present invention is not limited to this. For example, the image forming optical panel 14 (14A, 14E) can instead be configured to have a structure other than a louver structure for limiting the incident angle.

Other Modification Examples, Etc.

Each of the above devices may be configured as a computer system, more specifically one made up of a microprocessor, a ROM (read only memory), a RAM (random access memory), a hard disk drive, a display unit, a keyboard, a mouse, etc. A computer program is stored in the RAM or on the hard disk drive. The microprocessor operates according to the computer program, allowing the various devices to achieve their functions. Here, in order to achieve a specific function, the computer program is constituted by a combination of command codes indicating instructions to the computer.

Furthermore, some or all of the constituent elements that make up the above devices may be constituted by a single system LSI (large scale integration) circuit. A system LSI circuit is a super-multifunctional LSI manufactured by integrating a number of constituent parts on one chip, and more specifically, it is a computer system including a microprocessor, a ROM, a RAM, and the like. A computer program is stored in the RAM. The microprocessor operates under the computer program, allowing the system LSI circuit to achieve its function.

Moreover, some or all of the constituent elements that make up the above devices may be constituted by a single module or an IC card that can be inserted into and removed from each device. The IC card or module is a computer system made up of a microprocessor, a ROM, a RAM, and the like. The IC card or the module may include a super-multifunction LSI circuit. The microprocessor operates under the computer program, allowing the IC card or module to achieve its function. This IC card or module may be tamper resistant.

Also, the present invention may be the above-mentioned methods. The present invention may also be a computer program that allows these methods to be carried out by a computer, or may be a digital signal composed of the above-mentioned computer program.

Furthermore, the present invention can be the product of recording the above-mentioned computer program or the above-mentioned digital signal to a non-transitory computer-readable recording median, such as a flexible disk, a hard disk, a CD-ROM, an MO, a DVD, a DVD-ROM, a DVD-RAM, a BD, or a semiconductor memory. It may also be the above-mentioned digital signal recorded to one of these non-transitory recording media.

The present invention may also be the product of transmitting the above-mentioned computer program or the above-mentioned digital signal via an electrical communication line, a wireless or wired communication line, a network such as the Internet, a data broadcast, or the like.

The present invention may also be a computer system comprising a microprocessor and a memory, wherein the memory stores the above-mentioned computer program, and the microprocessor operates pertaining to this computer program.

Also, the present invention may be implemented by another, independent computer system, by recording and transferring the above-mentioned program or the above-mentioned digital signal to the above-mentioned non-transitory recording median, or by transferring the program or the digital signal via the above-mentioned network or the like.

In the above embodiments, the constituent elements may be made up of dedicated hardware or may be realized by executing a software program suited to each constituent element. Each constituent element may be realized by a program execution component such as a CPU or a processor that reads and executes a software program recorded to a recording median such as a hard disk or a semiconductor memory.

The aerial image display device of the present invention can be applied as a VUI or the like for operating external devices, for example.

[1] In view of the state of the known technology and in accordance with an aspect of the present invention, an aerial image display device includes a display component, an imaging component, and a first limiter. The display component has a display surface for displaying an image. The imaging component has a first reflecting surface and a second reflecting surface that are arranged perpendicular to each other along an image formation plane of the imaging component. The imaging component is configured to form an aerial image of the image in a display area that is symmetrical with the display surface with respect to the image formation plane. The first limiter is disposed closer to the display component than the imaging component. The first limiter is configured to limit an incident angle of incident light incident on the imaging component. The first reflection surface and the second reflection surface are inclined by an angle between 30° and 60° with respect to a median plane that includes a perpendicular of each of the display surface and the image formation plane.

With this configuration, the first limiter is disposed closer to the display component than the imaging component, and is configured to limit the incident angle of the incident light incident on the imaging component. Consequently, the light that is a source of ghosting can be removed by the first limiter. Thus, it is less likely that ghosting will occur within the viewing angle of the aerial image. As a result, the visibility of the aerial image can be improved. Also, the first reflecting surface and the second reflecting surface are each inclined at an angle of 30° to 60° with respect to the median plane. Thus, the aerial image can be efficiently separated from ghost images.

[2] In accordance with a preferred embodiment according to the aerial image display device mentioned above, the first reflecting surface and the second reflecting surface are inclined by 45° with respect to the median plane.

With this configuration, the aerial image and ghost images can be separated more efficiently.

[3] In accordance with a preferred embodiment according to any one of the aerial image display devices mentioned above, the first limiter has a plurality of light blocking parts and a plurality of translucent parts. The light blocking parts extend in a slender shape along a first direction and are arranged spaced apart from each other in a second direction that is perpendicular to the first direction. The translucent parts are disposed between adjacent pairs of the light blocking parts, respectively.

With this configuration, the first limiter can be formed as a so-called louver structure.

[4] In accordance with a preferred embodiment according to any one of the aerial image display devices mentioned above, the first direction is parallel to the median plane. The second direction is perpendicular to the median plane.

With this configuration, it is possible to limit the incident angle of the incident light incident on the imaging component in the direction perpendicular to the median plane.

[5] In accordance with a preferred embodiment according to any one of the aerial image display devices mentioned above, the first limiter is disposed at a position covering a face of the imaging component on the display component side.

[6] In accordance with a preferred embodiment according to any one of the aerial image display devices mentioned above, the first limiter is disposed at a position covering the display surface of the display component.

[7] In accordance with a preferred embodiment according to any one of the aerial image display devices mentioned above, the display component has a display panel with a front face that forms the display surface, and a backlight configured to emit light on a rear face of the display panel. The first limiter is disposed on the backlight.

[8] In accordance with a preferred embodiment according to any one of the aerial image display devices mentioned above, the aerial image display device further includes a second limiter disposed on an opposite side of the display component with respect to the imaging component. The second limiter is configured to limit an exit angle of exit light from the imaging component.

With this configuration, the formation of ghost images outside the viewing angle of the aerial image can be suppressed.

[9] In accordance with a preferred embodiment according to any one of the aerial image display devices mentioned above, the aerial image display device further includes a housing that houses the display component and the imaging component. The image formation plane of the imaging component is disposed along a side face of the housing.

With this configuration, the imaging component does not receive external light from straight ahead. Thus, it is less likely that external light will be reflected on the imaging component. Also, dust or other foreign matter floating in the air falls along the imaging component. Thus, this foreign matter will be less likely to adhere to the imaging component.

[10] In accordance with a preferred embodiment according to any one of the aerial image display devices mentioned above, the aerial image display device further includes an adjustment mechanism configured to tilt the imaging component with respect to the side face of the housing.

With this configuration, by tilting the imaging component with respect to the side face of the housing, external light from obliquely above the aerial image display device is not received from straight ahead. Thus, it is less likely that external light will be reflected on the imaging component. Also, by tilting the imaging component relative to the side face of the housing, the position of the aerial image can be adjusted.

[11] In accordance with a preferred embodiment according to any one of the aerial image display devices mentioned above, the adjustment mechanism is configured to adjust an angle of the image formation plane with respect to the side face of the housing within a range between 0° and 45°.

With this configuration, the movable range of the imaging component inside the housing can be kept small. Thus, it is possible to keep the housing from becoming bulkier.

[12] In accordance with a preferred embodiment according to any one of the aerial image display devices mentioned above, the aerial image display device further includes a pair of side wall portions protruding forward from the side face of the housing.

With this configuration, external light from the lateral direction is less likely to be reflected on the imaging component by the side wall portions.

[13] In accordance with a preferred embodiment according to any one of the aerial image display devices mentioned above, the side wall portions has upper ends that extend parallel to the aerial image formed in the display area.

With this configuration, the user can easily ascertain the position of the aerial image by using the top edges of the upper ends of the side wall portions as a reference.

[14] In accordance with a preferred embodiment according to any one of the aerial image display devices mentioned above, the aerial image display device further includes a frame component surrounding at least part of a circumference of the aerial image formed in the display area.

With this configuration, the user can easily ascertain the position of the aerial image by using the frame component as a reference.

[15] In accordance with a preferred embodiment according to any one of the aerial image display devices mentioned above, the aerial image display device further includes a light source, a sensor, and a controller. The light source is disposed outside of the frame component. The light source is configured to emit light into a detection region including the display area. The sensor is configured to sense the light reflected by an object in the detection region. The controller is configured to determine a position of the object in the detection region based on a sensing result of the sensor. The frame component has a cutaway portion that is configured to guide the light from the light source to the detection region.

With this configuration, the aerial image display device can be used as a virtual user interface (VUI). Also, the light from the light source can be guided to the detection region through the cutaway portion of the frame component.

[16] In accordance with a preferred embodiment according to any one of the aerial image display devices mentioned above, the aerial image display device further includes a first light source, a first sensor, and a controller. The first light source is configured to emit first light into a first detection region including the display area. The first sensor is configured to sense the first light reflected by an object in the first detection region. The controller is configured to determine a position of the object in the first detection region based on a sensing result of the first sensor.

With this configuration, the aerial image display device can be used as a VUI.

[17] In accordance with a preferred embodiment according to any one of the aerial image display devices mentioned above, the aerial image display device further includes a second light source, and a second sensor. The second light source is configured to emit second light into a second detection region that is disposed at a position opposite the first detection region. The second sensor is configured to sense the second light reflected by the object in the second detection region. The controller is further configured to determine a push operation of the object based on a sensing result of the second sensor.

With this configuration, a so-called hover function in a VUI can be realized.

[18] In accordance with a preferred embodiment according to any one of the aerial image display devices mentioned above, the imaging component includes a dihedral corner reflector array. The dihedral corner reflector array includes a translucent base component, a plurality of dihedral corner reflectors, and a light blocking layer. The base component has a first main face and a second main face that is disposed on an opposite side from the first main surface. The dihedral corner reflectors are arranged relative to each other on the first main face of the base component. The dihedral corner reflectors each have the first reflecting surface and the second reflecting surface. The light blocking layer covers a region of the second main face of the base component other than regions corresponding to the dihedral corner reflectors.

With this configuration, the generation of unnecessary light that would cause ghosting can be suppressed.

[19] In accordance with a preferred embodiment according to any one of the aerial image display devices mentioned above, the imaging component has a first light control panel that has a plurality of first translucent plates that are laminated in a first laminating direction, and a second light control panel that has a plurality of second translucent plates that are laminated in a second laminating direction that is perpendicular to the first laminating direction. Each of the first translucent plates has a first main face on which the first reflecting surface is formed, a second main face disposed on an opposite side from the first main face, and a first light blocking layer disposed on the second main face. Each of the second translucent plates has a third main face on which the second reflecting surface is formed, a fourth main face disposed on an opposite side from the third main face, and a second light blocking layer disposed on the fourth main face.

With this configuration, the generation of unnecessary light that would cause ghosting can be suppressed.

[20] In accordance with a preferred embodiment according to any one of the aerial image display devices mentioned above, the imaging component is configured to form the aerial image of the image by reflecting the incident light by both the first reflection surface and the second reflection surface.

The present invention can also be realized as a program for causing a computer to function as a characteristic processor included in an aerial image display apparatus, or a program for causing a computer to execute a characteristic step included in an aerial image display method. It should go without saying that such a program can be distributed via a non-transitory computer-readable recording median such as a CD-ROM (compact disc-read only memory) or a communication network such as the Internet.

With the aerial image display device, the visibility of an aerial image can be improved by suppressing the formation of ghost images.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "forward", "rearward", "front", "rear", "up", "down", "above", "below", "upward", "downward", "top", "bottom", "side", "vertical", "horizontal", "perpendicular" and "transverse" as well as any other similar directional terms refer to those directions of an aerial image display device in an upright position. Accordingly, these directional terms, as utilized to describe the aerial image display device should be interpreted relative to an aerial image display device in an upright position on a horizontal surface. The terms "left" and "right" are used to indicate the "right" when referencing from the right side as viewed from the front of the aerial image display device, and the "left" when referencing from the left side as viewed from the front of the aerial image display device.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An aerial image display device comprising:
a display component having a display surface for displaying an image;
an imaging component having a first reflecting surface and a second reflecting surface that are arranged perpendicular to each other along an image formation plane of the imaging component, the imaging component forming an aerial image of the image in a display area that is symmetrical with the display surface with respect to the image formation plane; and
a first limiter disposed closer to the display component than the imaging component, the first limiter limiting an incident angle of incident light incident on the imaging component to 30° or less such that incident light having an incident angle more than 30° is not incident on the imaging component,
the first reflecting surface and the second reflecting surface being inclined by an angle between 30° and 60° with respect to a median plane that includes a perpendicular of each of the display surface and the image formation plane.

2. The aerial image display device according to claim 1, wherein
the first reflecting surface and the second reflecting surface are inclined by 45° with respect to the median plane.

3. The aerial image display device according to claim 1, wherein
the first limiter has
a plurality of light blocking parts that extend in a slender shape along a first direction and that are arranged spaced apart from each other in a second direction that is perpendicular to the first direction, and
a plurality of translucent parts that are disposed between adjacent pairs of the light blocking parts, respectively.

4. The aerial image display device according to claim 3, wherein
the first direction is parallel to the median plane, and
the second direction is perpendicular to the median plane.

5. The aerial image display device according to claim 1, wherein
the first limiter is disposed at a position covering the display surface of the display component.

6. The aerial image display device according to claim 1, wherein
the display component has
a display panel with a front face that forms the display surface, and
a backlight that emits light on a rear face of the display panel, and
the first limiter is disposed on the backlight.

7. The aerial image display device according to claim 1, further comprising
a housing that houses the display component and the imaging component,
the image formation plane of the imaging component being disposed along a side face of the housing.

8. The aerial image display device according to claim 7, further comprising
an adjustment mechanism that tilts the imaging component with respect to the side face of the housing.

9. The aerial image display device according to claim 8, wherein
the adjustment mechanism adjusts an angle of the image formation plane with respect to the side face of the housing within a range between 0° and 45°.

10. The aerial image display device according to claim 7, further comprising
a pair of side wall portions protruding forward from the side face of the housing.

11. The aerial image display device according to claim 10, wherein
the side wall portions has upper ends that extend parallel to the aerial image formed in the display area.

12. The aerial image display device according to claim 7, further comprising
a frame component surrounding at least part of a circumference of the aerial image formed in the display area.

13. The aerial image display device according to claim 12, further comprising
a light source disposed outside of the frame component, the light source emitting light into a detection region including the display area,
a sensor that senses the light reflected by an object in the detection region, and
a controller that determines a position of the object in the detection region based on a sensing result of the sensor,
the frame component having a cutaway portion that guides the light from the light source to the detection region.

14. The aerial image display device according to claim 1, further comprising
a first light source that emits first light into a first detection region including the display area,
a first sensor that senses the first light reflected by an object in the first detection region, and
a controller that determines a position of the object in the first detection region based on a sensing result of the first sensor.

15. The aerial image display device according to claim 14, further comprising
a second light source that emits second light into a second detection region that is disposed at a position opposite the first detection region, and
a second sensor that senses the second light reflected by the object in the second detection region,
the controller determining a push operation of the object based on a sensing result of the second sensor.

16. The aerial image display device according to claim 1, wherein the imaging component includes a dihedral corner reflector array, the dihedral corner reflector array including
a translucent base component that has a first main face and a second main face that is disposed on an opposite side from the first main surface,
a plurality of dihedral corner reflectors that are arranged relative to each other on the first main face of the base component, the dihedral corner reflectors each having the first reflecting surface and the second reflecting surface, and
a light blocking layer covering a region of the second main face of the base component other than regions corresponding to the dihedral corner reflectors.

17. The aerial image display device according to claim 1, wherein
the imaging component has
a first light control panel that has a plurality of first translucent plates that are laminated in a first laminating direction, and
a second light control panel that has a plurality of second translucent plates that are laminated in a second laminating direction that is perpendicular to the first laminating direction,
each of the first translucent plates having
a first main face on which the first reflecting surface is formed,
a second main face disposed on an opposite side from the first main face, and
a first light blocking layer disposed on the second main face, and
each of the second translucent plates having
a third main face on which the second reflecting surface is formed,
a fourth main face disposed on an opposite side from the third main face, and
a second light blocking layer disposed on the fourth main face.

18. The aerial image display device according to claim 1, wherein
the imaging component forms the aerial image of the image by reflecting the incident light by both the first reflecting surface and the second reflecting surface.

19. An aerial image display device comprising:
a display component having a display surface for displaying an image;
an imaging component having a first reflecting surface and a second reflecting surface that are arranged perpendicular to each other along an image formation plane of the imaging component, the imaging component forming an aerial image of the image in a display area that is symmetrical with the display surface with respect to the image formation plane; and
a first limiter disposed closer to the display component than the imaging component, the first limiter limiting an incident angle of incident light incident on the imaging component,
the first reflecting surface and the second reflecting surface being inclined by an angle between 30° and 60° with respect to a median plane that includes a perpendicular of each of the display surface and the image formation plane,
the first limiter being disposed at a position covering a face of the imaging component on the display component side.

20. An aerial image display device comprising:
a display component having a display surface for displaying an image;
an imaging component having a first reflecting surface and a second reflecting surface that are arranged perpendicular to each other along an image formation plane of the imaging component, the imaging component forming an aerial image of the image in a display area that is symmetrical with the display surface with respect to the image formation plane;
a first limiter disposed closer to the display component than the imaging component, the first limiter limiting an incident angle of incident light incident on the imaging component; and
a second limiter disposed on an opposite side of the display component with respect to the imaging component, the second limiter limiting an exit angle of exit light from the imaging component,
the first reflecting surface and the second reflecting surface being inclined by an angle between 30° and 60° with respect to a median plane that includes a perpendicular of each of the display surface and the image formation plane.

\* \* \* \* \*